United States Patent
Wada et al.

(10) Patent No.: US 10,798,580 B2
(45) Date of Patent: Oct. 6, 2020

(54) INFORMATION PROCESSING DEVICE

(71) Applicant: Kabushiki Kaisha Toshiba, Minato-ku (JP)

(72) Inventors: Hiroho Wada, Yokohama (JP); Tomoko Yonemura, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 270 days.

(21) Appl. No.: 15/932,201

(22) Filed: Feb. 16, 2018

(65) Prior Publication Data

US 2018/0316667 A1 Nov. 1, 2018

(30) Foreign Application Priority Data

Apr. 27, 2017 (JP) ................. 2017-088696

(51) Int. Cl.
*H04L 29/06* (2006.01)
*H04W 12/12* (2009.01)
(Continued)

(52) U.S. Cl.
CPC ............ *H04W 12/12* (2013.01); *G06F 21/64* (2013.01); *H04L 9/3236* (2013.01); *H04L 9/3247* (2013.01); *H04L 9/3297* (2013.01); *H04L 63/0823* (2013.01); *H04L 63/0869* (2013.01); *H04L 63/123* (2013.01); *H04W 4/70* (2018.02); *H04W 12/1008* (2019.01); *G06F 2221/2151* (2013.01); *H04L 2209/38* (2013.01)

(58) Field of Classification Search
CPC ............ H04L 63/0869; H04L 63/0823; H04L 63/123; H04L 9/3236; H04L 9/3247; H04L 9/3297; H04L 2209/38; H04W 4/70; H04W 12/10; H04W 12/12; H04W 12/1008; G06F 21/64; G06F 2221/2151
See application file for complete search history.

(56) References Cited

U.S. PATENT DOCUMENTS

2004/0158635 A1\* 8/2004 Walls-Manning .... H04L 69/329
709/226
2014/0037092 A1 2/2014 Bhattacharya et al.
(Continued)

FOREIGN PATENT DOCUMENTS

JP 2002-063139 2/2002
JP 2007-221551 8/2007
(Continued)

*Primary Examiner* — Sarah Su
(74) *Attorney, Agent, or Firm* — Oblon, McClelland, Maier & Neustadt, L.L.P.

(57) ABSTRACT

According to an embodiment, an information processing device includes one or more processors configured to: receive first connected information including first information and first authentication information to authenticate the first information; add, to the first connected information, guarantee information to guarantee an anteroposterior relation of reception of the first connected information; and generate second authentication information to authenticate the first information, the guarantee information, and the first authentication information, the second authentication information being generated using the first information or the first authentication information and using the guarantee information.

18 Claims, 11 Drawing Sheets

(51) Int. Cl.
*H04L 9/32* (2006.01)
*H04W 4/70* (2018.01)
*G06F 21/64* (2013.01)
*H04W 12/10* (2009.01)

(56) References Cited

U.S. PATENT DOCUMENTS

2015/0043025 A1* 2/2015 Lahmi .................... G06F 21/64
358/1.14
2015/0067794 A1* 3/2015 Blakely ............... H04L 63/0846
726/5

FOREIGN PATENT DOCUMENTS

| | | |
|---|---|---|
| JP | 2010-074339 | 4/2010 |
| JP | 2011-131762 | 7/2011 |
| JP | 2012-044355 | 3/2012 |
| JP | 2017-050848 | 3/2017 |
| WO | WO 2016/131575 A1 | 8/2016 |

* cited by examiner

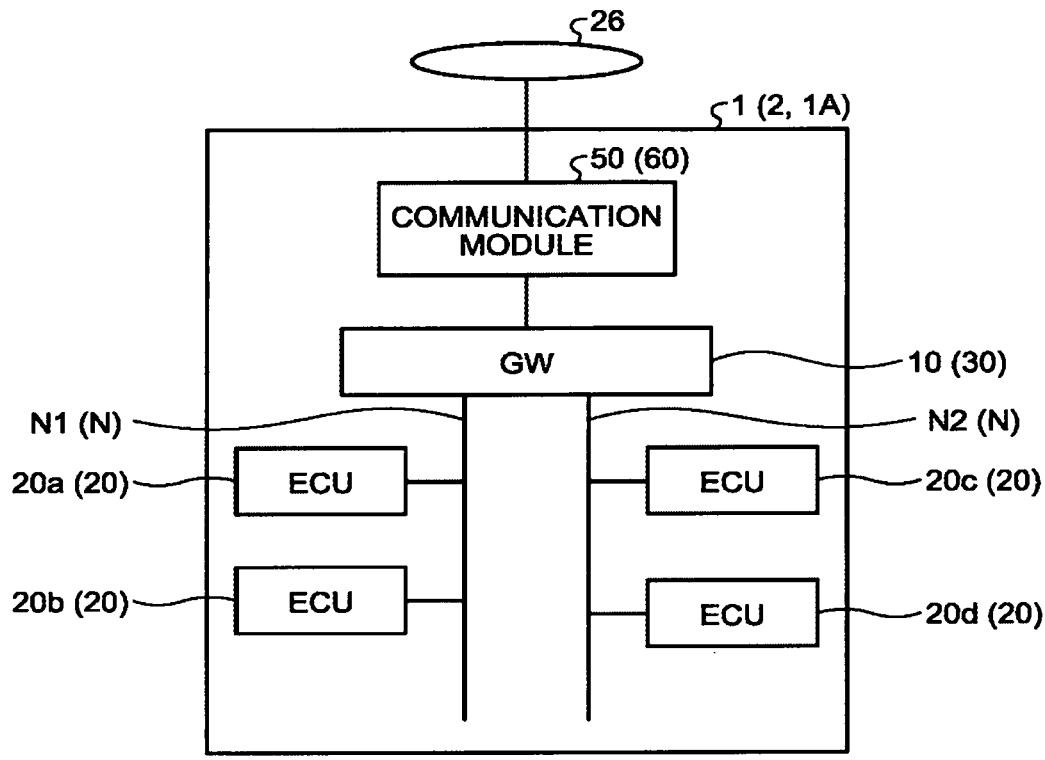
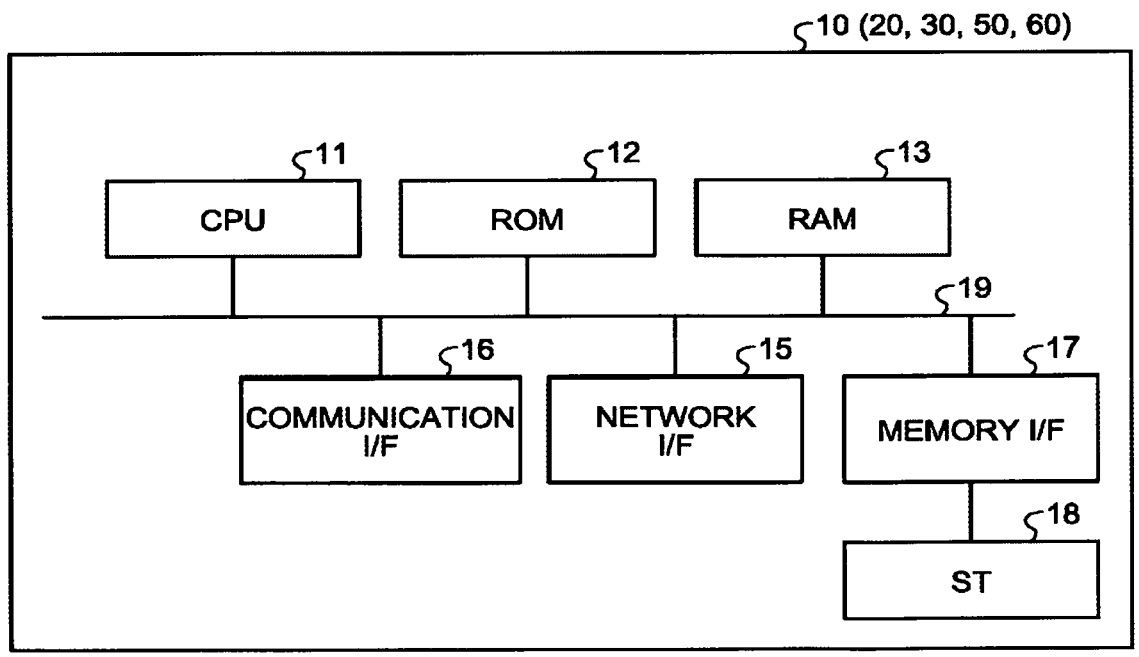

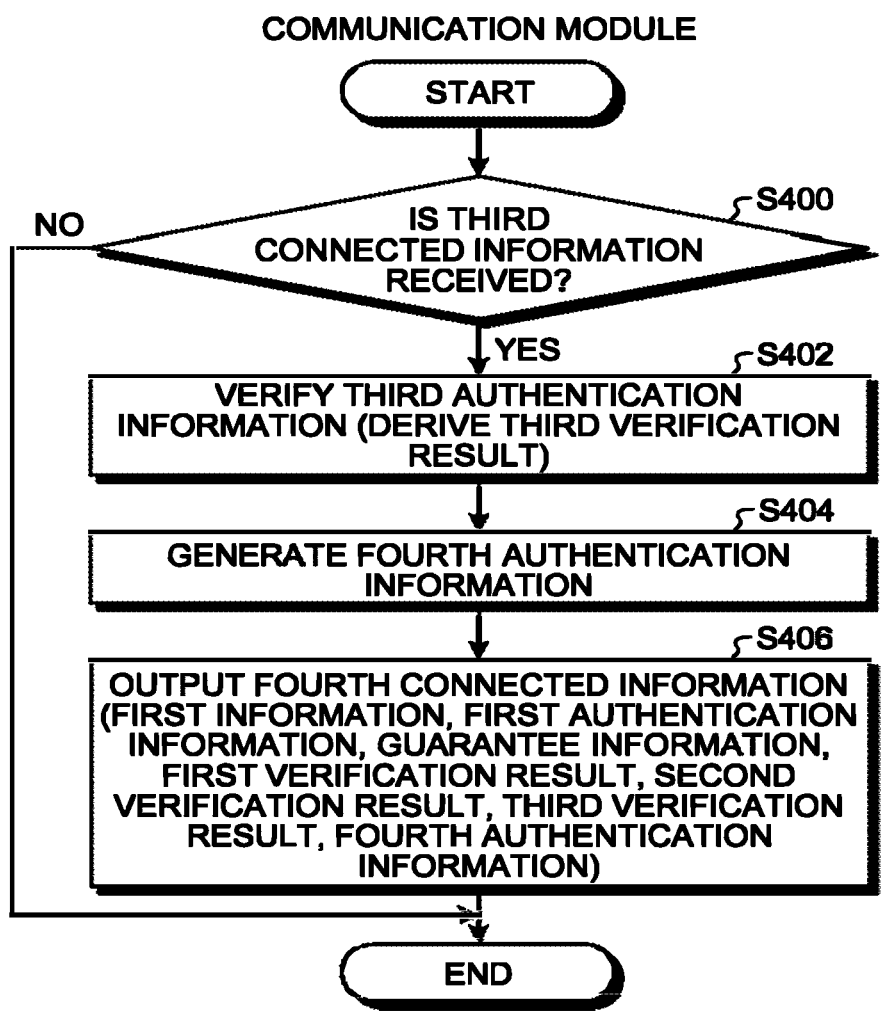

US 10,798,580 B2

INFORMATION PROCESSING DEVICE

CROSS-REFERENCE TO RELATED APPLICATIONS

This application is based upon and claims the benefit of priority from Japanese Patent Application No. 2017-088696, filed on Apr. 27, 2017; the entire contents of which are incorporated herein by reference.

FIELD

Embodiments described herein relate generally to an information processing device.

BACKGROUND

A system in which a plurality of electronic devices are connected to a network and communication between these electronic devices is performed through a gateway device (GW) has been known. For example, a structure having such a system in a vehicle has been disclosed. In addition, data communicated in the vehicle is used to analyze the traveling state of the vehicle.

A plurality of electronic devices are mounted in the vehicle. The electronic devices output a plurality of pieces of data at various timings. Therefore, at the analysis, it is necessary to specify the anteroposterior relation between the data output from the electronic device and another data. If the data output from the electronic device is altered, a trouble is caused in the analysis and thus, it is necessary to verify that the data is not altered. In one of the conventionally disclosed techniques, authentication information is added to the data output from the electronic device and the data is output. In the conventional technique, however, the authentication information has been added on the premise that the anteroposterior relation of the data is guaranteed. Thus, it has been difficult to provide the data that can achieve an efficient analysis.

An object of the present invention is to provide an information processing device that can provide data to achieve an efficient analysis.

BRIEF DESCRIPTION OF THE DRAWINGS

FIG. 1 is a schematic diagram of an information processing system;

FIG. 2 is a block diagram illustrating a hardware structure;

FIG. 12 is a flowchart illustrating a procedure of information processing in a communication module.

DETAILED DESCRIPTION

Figure 3:
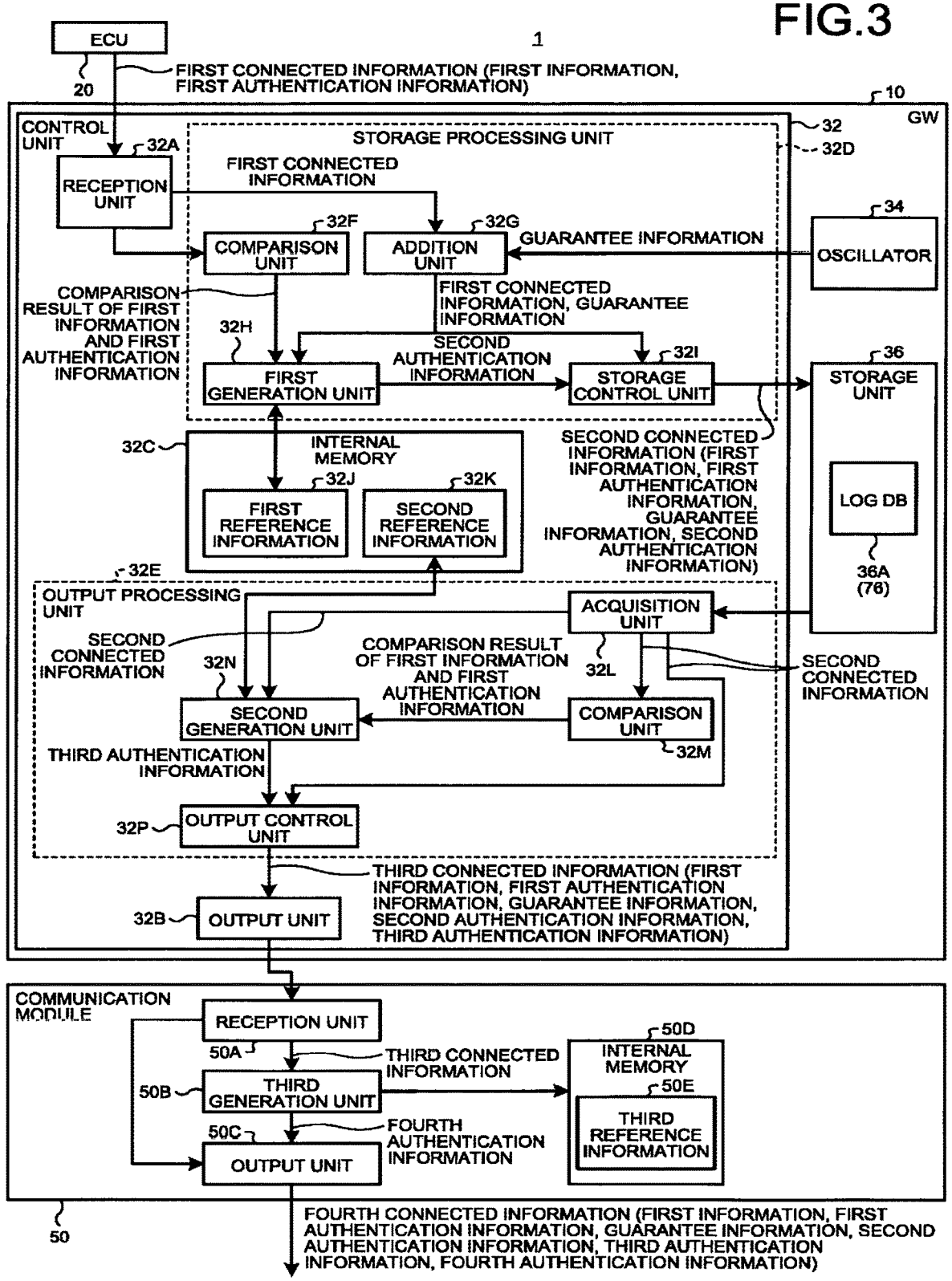
FIG. 3 is a block diagram illustrating a functional structure example of a GW and a communication module.

According to an embodiment, an information processing device includes one or more processors configured to: receive first connected information including first information and first authentication information to authenticate the first information; add, to the first connected information, guarantee information to guarantee an anteroposterior relation of reception of the first connected information; and generate second authentication information to authenticate the first information, the guarantee information, and the first authentication information, the second authentication information being generated using the first information or the first authentication information and using the guarantee information.

An information processing system according to an embodiment is applicable to, for example, an on-vehicle network system (communication system) that is mounted on a vehicle corresponding to one example of moving bodies. In an example to be described below, an on-vehicle gateway device (GW) included in an on-vehicle network system is structured as an information processing device according to the embodiment.

A device and a system to which the information processing system according to the embodiment is applicable are not limited to the examples below. The information processing system according to the embodiment is widely applicable to various systems that communicate data to be analyzed.

First Embodiment

FIG. 1 is a schematic diagram illustrating a summary of an information processing system 1. The information processing system 1 is, for example, mounted on a vehicle 2.

The information processing system 1 includes a GW 10 and a plurality of electronic control units (ECUs) 20. The ECUs 20 and the GW 10 are connected through a network N. In the example illustrated in FIG. 1, the information processing system 1 includes a plurality of sub-networks (sub-network N1, sub-network N2) as the network N. To each of these sub-networks, the ECUs 20 are connected. Moreover, these sub-networks are connected to the GW 10.

To the GW 10, a communication module 50 is connected. The communication module 50 is a module that communicates with an external device through an external network 26.

The GW 10 corresponds to one example of information processing devices. In addition to original functions of the gateway, the GW 10 performs various processes to be described below. Examples of the original functions of the gateway include relay of communication between the sub-networks in the information processing system 1 (for example, the sub-network N1, the sub-network N2), relay of communication between the information processing system 1 and the external network 26 outside the vehicle, and relay of direct communication with another vehicle 2.

The ECU 20 is a device that performs various electronic controls in the vehicle 2. FIG. 1 illustrates one example in which the information processing system 1 includes four ECUs 20 (ECU 20a to ECU 20d). However, the number of ECUs 20 included in the information processing system 1 is not limited to four. In addition to the original functions of the electronic device, the ECU 20 performs processes to be described below.

There is no particular limitation on the communication standard of the information processing system 1. The communication standard of the information processing system 1 is, for example, controller area network (CAN) or FlexRay (registered trademark).

FIG. 2 is a block diagram illustrating a hardware structure example of the GW 10. The GW 10 has a structure in which a control device such as a central processing unit (CPU) 11, storage devices such as a read only memory (ROM) 12 and a random access memory (RAM) 13, a network I/F 15, a communication I/F 16, and a memory I/F 17 are connected through a bus 19.

The network I/F 15 is a communication interface to communicate with the ECU 20 through the sub-network. The communication I/F 16 is a communication interface to communicate with an external device through the external network 26. The memory I/F 17 is an interface to access a storage (ST) 18. The ST 18 is a memory to store various pieces of information therein.

In the GW 10, various functions to be described below are achieved when the CPU 11 develops programs from the ROM 12 to the RAM 13 and executes the programs. Hardware structures of the ECU 20 and the communication module 50 are similar to the hardware structure of FIG. 2.

FIG. 3 is a block diagram illustrating a functional structure example of the GW 10 and the communication module 50 included in the information processing system 1 according to the present embodiment.

GW 10

First, the GW 10 is described. The GW 10 includes a control unit 32, an oscillator 34, and a storage unit 36. The oscillator 34 and the storage unit 36, and the control unit 32 are connected so as to exchange data and signals with each other.

The storage unit 36 stores various pieces of information therein. The storage unit 36 corresponds to one example of storage units. The storage unit 36 is, for example, achieved by the ST 18 (see FIG. 2). In the present embodiment, the storage unit 36 stores a log DB 36A therein (the details will be described below).

The control unit 32 incorporates a computer system as an integrated circuit, and performs various controls in accordance with programs (software) that operates on the computer system. The control unit 32 includes a reception unit 32A, an output unit 32B, an internal memory 32C, a storage processing unit 32D, and an output processing unit 32E. The storage processing unit 32D includes a comparison unit 32F, an addition unit 32G, a first generation unit 32H, and a storage control unit 32I. The output processing unit 32E includes an acquisition unit 32L, a comparison unit 32M, a second generation unit 32N, and an output control unit 32P.

Each of these units (reception unit 32A, output unit 32B, internal memory 32C, storage processing unit 32D, output processing unit 32E, comparison unit 32F, addition unit 32G, first generation unit 32H, storage control unit 32I, acquisition unit 32L, comparison unit 32M, second generation unit 32N, and output control unit 32P) is achieved by, for example, one or a plurality of processors. For example, each unit may be achieved by having a processor such as the CPU 11 execute the programs, that is, by software. In another example, each unit may be achieved by a processor such as a dedicated integrated circuit (IC), that is, by hardware. Alternatively, each unit may be achieved by using both software and hardware. In the case of using a plurality of processors, each processor may achieve one of these units, or two or more units.

The reception unit 32A receives first connected information from the ECU 20.

The first connected information includes first information and first authentication information. In the present embodiment, the first connected information is structured by the first information and the first authentication information.

The first information is actual data output from the ECU 20. The first information is data generated by the electronic control of the ECU 20. For example, the first information is data used to analyze the traveling state of the vehicle 2. Specifically, the first information is log data including the log acquired by the ECU 20 in regard to results of monitoring a driving environment, communication inside and outside the vehicle 2, operation of the driver, and the system status in the vehicle 2.

The first authentication information is one example of authentication information. The first authentication information authenticates the first information. The authentication information guarantees that the first information is not altered or the communication between the ECU 20 and the GW 10 is valid. The authentication information is, for example, a message authentication code (MAC), a random number, a counter value, a hash function, or a digital signature.

The reception unit 32A outputs the first connected information to the storage processing unit 32D.

The storage processing unit 32D is a function unit that performs a storing process to the storage unit 36. As described above, the storage processing unit 32D includes the comparison unit 32F, the addition unit 32G, the first generation unit 32H, and the storage control unit 32I.

The addition unit 32G adds guarantee information to the first connected information received in the reception unit 32A. The addition unit 32G adds one piece of guarantee information to one piece of first connected information received in the reception unit 32A. Note that the addition unit 32G may add one piece of guarantee information to a plurality of pieces of first connected information received successively in time series in the reception unit 32A. For example, the addition unit 32G may add one piece of guarantee information for each predetermined number of pieces of first connected information. The number of pieces of first connected information to which one piece of guarantee information is added may be changed as appropriate in accordance with the user's operation instruction or the like. The addition unit 32G may change the number of pieces of first connected information to which one piece of guarantee information is added, when a predetermined condition is satisfied.

The guarantee information guarantees the anteroposterior relation of the reception of the first connected information.

The guarantee information is, for example, the time information regarding the reception of the first connected information. In the case of adding one piece of guarantee information to one piece of first connected information, the addition unit 32G adds the time information expressing the reception time of the first connected information to the first connected information as the guarantee information.

When one piece of guarantee information is added to a plurality of pieces of first connected information, the addition unit 32G adds the time information expressing one timing in a reception period of the pieces of first connected information as the guarantee information to the pieces of first connected information that are in succession in time series. The one timing in the reception period is, for example, the first timing in the reception period, the central timing in the reception period, the last timing in the reception period, or the like.

The guarantee information may be, for example, count information regarding the reception of the first connected information. For example, if one piece of guarantee information is added to one piece of first connected information, the addition unit 32G increments a counter value of a counter by "1" every time one piece of first connected information is received. Then, the addition unit 32G adds counter information expressing the counter value of the counter when receiving the first connected information as the guarantee information for the first connected information.

In the case of adding one piece of guarantee information to a plurality of pieces of first connected information, the addition unit 32G may add, as one piece of guarantee information for the pieces of first connected information, the count information expressing the counter value at one timing in the reception period of the pieces of first connected information to the pieces of first connected information that are in succession in time series.

Note that in the case of adding one piece of guarantee information to a plurality of pieces of first connected information, the addition unit 32G increments the counter value by "1" every time the pieces of first connected information corresponding to a unit for addition of the guarantee information are received. Then, the addition unit 32G may add the count information expressing the counter value of the counter when receiving these pieces of first connected information, as the guarantee information for these pieces of first connected information.

The addition unit 32G may obtain the guarantee information from the oscillator 34. The oscillator 34 is the device that oscillates a clock signal. The addition unit 32G may add the guarantee information in accordance with the clock signal of the oscillator 34 (time information or counter value) to the first connected information.

The oscillator 34 may be provided outside the GW 10. For example, the oscillator 34 may be provided inside the information processing system 1 and outside the GW 10. The oscillator 34 may be provided outside the information processing system 1. In this case, the addition unit 32G may acquire the clock signal from the oscillator 34 provided outside the GW 10 and use the acquired clock signal when the guarantee information is added. Note that each device included in the information processing system 1 (GW 10, ECU 20, communication module 50) preferably performs various processes in synchronization with the clock signal oscillated from the oscillator 34.

The addition unit 32G outputs the first connected information and the guarantee information added to the first connected information to the first generation unit 32H and the storage control unit 32I.

The comparison unit 32F receives the first connected information from the reception unit 32A. The comparison unit 32F compares the data size between the first information and the first authentication information included in the received first connected information. The comparison unit 32F outputs to the first generation unit 32H, a comparison result expressing which one of the first information and the first authentication information has a smaller data size.

The first generation unit 32H generates second authentication information, the second authentication information being generated using the first information or the first authentication information, and the guarantee information.

The second authentication information is one example of the authentication information. The second authentication information authenticates the first information, the guarantee information, and the first authentication information. As described above, examples of the authentication information include MAC, the random number, the counter value, the hash function, or the digital signature.

Specifically, the first generation unit 32H receives the result of comparing the data size between the first information and the first authentication information included in the first connected information received in the reception unit 32A from the comparison unit 32F. The first generation unit 32H receives, from the addition unit 32G, the first connected information received in the reception unit 32A and the guarantee information added to the first connected information.

The first generation unit 32H generates the second authentication information using the guarantee information and one of the first information and the first authentication information that has a smaller data size in the first connected information.

Here, the time of generating the authentication information is longer as the data based on which authentication information is generated has longer data length. Therefore, the first generation unit 32H preferably generates the second authentication information by using one of the first information and the first authentication information that has a smaller data size in the first connected information. This enables the first generation unit 32H to generate the second authentication information in a shorter time.

In addition, the first generation unit 32H generates the second authentication information, the second authentication information being generated using the first information or the first authentication information, and using the guarantee information. Therefore, the first generation unit 32H can generate the second authentication information for the data whose anteroposterior relation of the reception in the GW 10 is guaranteed.

A method of generating the second authentication information is specifically described. FIG. 4A to FIG. 4E are diagrams illustrating examples of a method of generating the second authentication information.

Figure 4A:
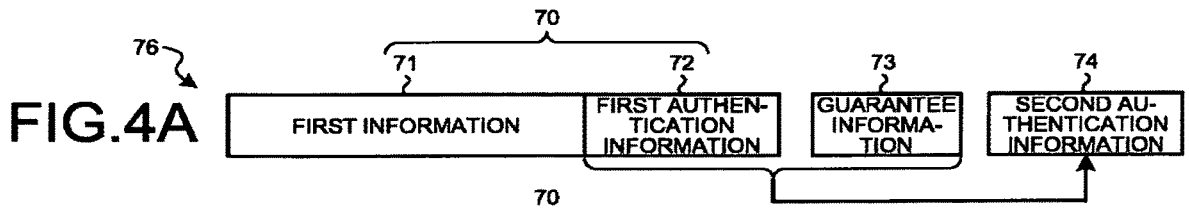
FIG. 4A to FIG. 4E are diagrams each describing a method of generating second authentication information.

FIG. 4A illustrates one example of the method of generating second authentication information 74 in the case where the addition unit 32G adds one piece of guarantee information 73 to one piece of first connected information 70. For example, the first generation unit 32H generates the second authentication information 74, the second authentication information 74 being generated using first authentication information 72 included in the first connected information 70, the guarantee information 73 added to the first connected information 70, and reference information.

The reference information is referred to when the authentication information is generated. For example, when the authentication information is a MAC, the reference information is a common key. When the authentication information is a random number, the reference information is a random number before update and a random number generator. When the authentication information is a counter value, the reference information is a counter value before update and a counter. When the authentication information is a digital signature, the reference information is a public key and a hash function.

For example, the GW 10 stores first reference information 32J in advance in the internal memory 32C (see FIG. 3). The first reference information 32J is one example of reference information, and is used when the first generation unit 32H generates the second authentication information 74. The first generation unit 32H may read the first reference information 32J from the internal memory 32C, and use the first reference information 32J to generate the second authentication information 74.

Figure 4B:
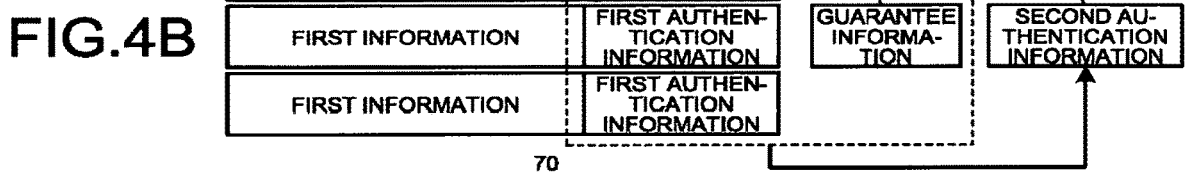
Figure 4C:
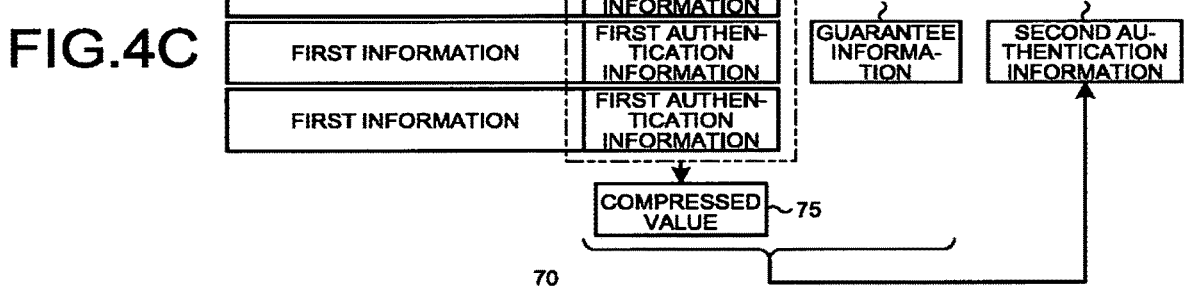

Next, description is made with reference to FIG. 4B and FIG. 4C. Each of FIG. 4B and FIG. 4C illustrates one example of the method of generating the second authentication information 74 in the case where the addition unit 32G adds one piece of guarantee information 73 to a plurality of pieces of first connected information 70.

For example, the first generation unit 32H generates the second authentication information 74, the second authentication information 74 being generated using first information 71 or the first authentication information 72 included in each of the pieces of first connected information 70, and using one piece of guarantee information 73 added to the pieces of first connected information 70.

Specifically, as illustrated in FIG. 4B, the first generation unit 32H generates the second authentication information 74, the second authentication information 74 being generated using the first authentication information 72 included in each of the pieces of first connected information 70, the guarantee information 73 added to the pieces of first connected information 70, and the first reference information 32J (see FIG. 3). Alternatively, the first generation unit 32H may extract the first information 71 or the first authentication information 72 that has the smaller data size from each of the pieces of first connected information 70, and use the extracted pieces of information to generate the second authentication information 74.

In another example, the first generation unit 32H may generate the second authentication information 74 using a compressed value of the first information 71 or the first authentication information 72 included in each of the pieces of first connected information 70, and using one piece of guarantee information 73 added to the pieces of first connected information 70.

Specifically, as illustrated in FIG. 4C, the first generation unit 32H calculates a compressed value 75 of the first authentication information 72 included in each of the pieces of first connected information 70. That is to say, the first generation unit 32H calculates the compressed value 75 of a plurality of pieces of first authentication information 72. The compressed value 75 is the information acquired by compressing the pieces of first authentication information 72. The compressed value 75 is, for example, a hash value. When the compressed value 75 is a hash value, the first generation unit 32H may calculate the compressed value 75 (hash value) from the pieces of first authentication information 72 using the hash function.

Alternatively, the first generation unit 32H may extract one of the first information 71 and the first authentication information 72 that has the smaller data size from each of the pieces of first connected information 70, and calculate the compressed value 75 using the extracted pieces of information.

The first generation unit 32H may generate the second authentication information 74 using the compressed value 75, the guarantee information 73 added to the pieces of first connected information 70, and the first reference information 32J (see FIG. 3).

Figure 4D:
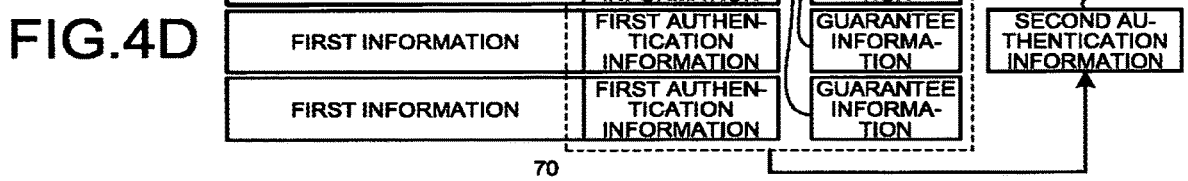
Figure 4E:
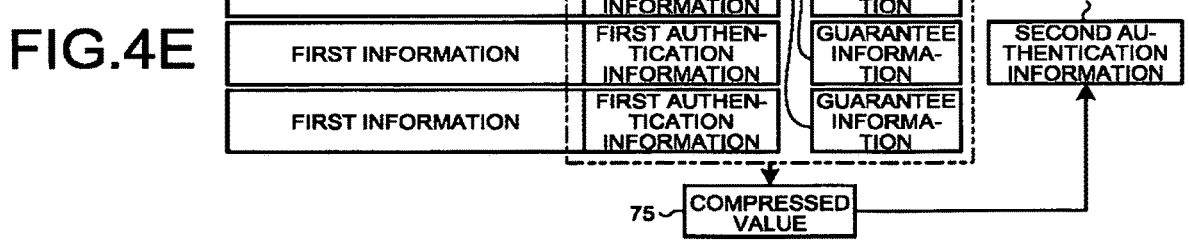

Next, description is made with reference to FIG. 4D and FIG. 4E. FIG. 4D and FIG. 4E illustrate examples of the method of generating the second authentication information 74 in a case where the addition unit 32G adds a plurality of pieces of guarantee information 73 to the pieces of first connected information 70, respectively.

For example, the first generation unit 32H generates the second authentication information 74 using the first information 71 or the first authentication information 72 included in each of the pieces of first connected information 70, and the pieces of the guarantee information 73 respectively corresponding to the pieces of first connected information 70. Specifically, as illustrated in FIG. 4D, the first generation unit 32H generates the second authentication information 74 using the first authentication information 72 included in each of the pieces of first connected information 70, the pieces of guarantee information 73 respectively corresponding to the pieces of first connected information 70, and the first reference information 32J (see FIG. 3). Alternatively, the first generation unit 32H may extract one of the first information 71 and the first authentication information 72 that has the smaller data size from each of the pieces of first connected information 70, and may use the extracted pieces of information to generate the second authentication information 74.

In another example, the first generation unit 32H may generate the second authentication information 74 using the compressed value 75 of the first information 71 or the first authentication information 72 included in each of the pieces of first connected information 70, and the pieces of guarantee information 73 respectively corresponding to the pieces of first connected information 70. Specifically, as illustrated in FIG. 4E, the first generation unit 32H calculates the compressed value 75 of the first authentication information 72 included in each of the pieces of first connected information 70 and the pieces of guarantee information 73 respectively corresponding to the pieces of first connected information 70. Alternatively, the first generation unit 32H may extract one of the first information 71 and the first authentication information 72 that has the smaller data size from each of the pieces of first connected information 70, and may use the extracted pieces of information to calculate the compressed value 75.

The first generation unit 32H may generate the second authentication information 74 using the compressed value 75 and the first reference information 32J (see FIG. 3).

Back to FIG. 3, the description is continued. The storage control unit 32I is one example of the first output control unit. The storage control unit 32I outputs second connected information 76 including the first information 71, the first authentication information 72, the guarantee information 73, and the second authentication information 74. For example, the storage control unit 32I outputs the second connected information 76 to the storage unit 36. Thus, the storage control unit 32I causes the storage unit 36 to store the second connected information 76 therein. Note that the output destination of the second connected information 76 is not limited to the storage unit 36. For example, the storage control unit 32I may directly output the second connected information 76 to the output control unit 32P to be described below, without causing the storage unit 36 to store the second connected information 76 therein.

The storage control unit 32I receives the second authentication information from the first generation unit 32H. The storage control unit 32I receives the first connected information 70 (first information 71, first authentication information 72) and the guarantee information 73 from the addition unit 32G. Then, the storage control unit 32I causes the storage unit 36 to store the second connected information 76 including the first information 71, the first authentication information 72, the guarantee information 73, and the second authentication information 74.

Figure 5:
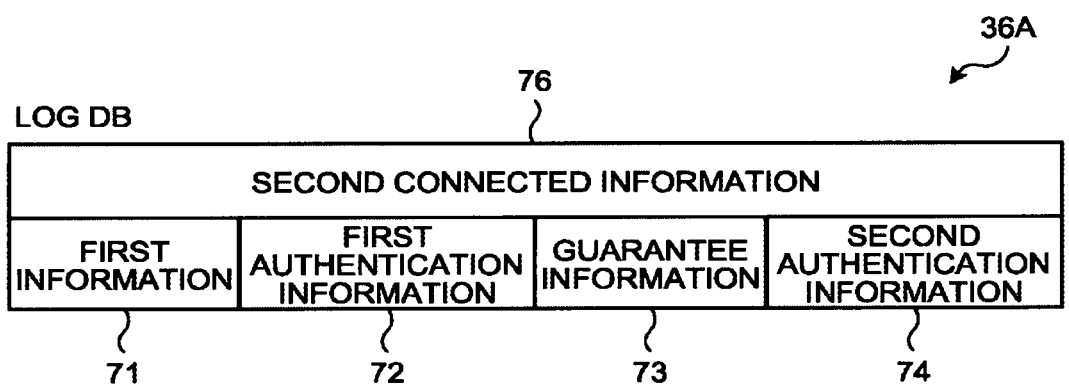
FIG. 5 is a schematic diagram illustrating a data structure of a log DB.

Specifically, the storage control unit 32I causes the storage unit 36 to store the second connected information 76 therein by registering the second connected information 76 in a log DB 36A. FIG. 5 is a schematic diagram illustrating one example of a data structure of the log DB 36A. The log DB 36A is a database for storing the second connected information 76 therein. Specifically, the log DB 36A is a database in which the first information 71, the first authentication information 72, the guarantee information 73, and the second authentication information 74 are associated with each other. The data structure of the log DB 36A is not limited to the database. For example, the data structure of the log DB 36A may be a table or the like. Note that the storage unit 36 and the log DB 36A may be installed outside the GW 10 (inside the information processing system 1).

Back to FIG. 3, the description is continued. Next, the output processing unit 32E is described. The output processing unit 32E controls to output to the communication module 50, third connected information (the details will be described below) generated based on the second connected information 76 stored in the storage unit 36. The output processing unit 32E may control to output the third connected information to the communication module 50 when a predetermined condition is satisfied.

For example, the output processing unit 32E may control to output to the communication module 50, the stored second connected information 76 every time the control unit 32 causes the storage unit 36 to store the second connected information 76 therein. In another example, the output processing unit 32E may control to output to the communication module 50, the second connected information stored in the storage unit 36 for every predetermined time or every time the second connected information 76 with a predetermined data quantity is stored in the storage unit 36. In still another example, the output processing unit 32E may control to output to the communication module 50, the second connected information 76 stored in the storage unit 36 when a signal expressing a request to output a log is received through the communication module 50 from an external device or the like.

The output processing unit 32E includes the acquisition unit 32L, the comparison unit 32M, the second generation unit 32N, and the output control unit 32P. The acquisition unit 32L acquires the second connected information from the storage unit 36. The acquisition unit 32L outputs the acquired second connected information 76 to the comparison unit 32M and the second generation unit 32N.

The comparison unit 32M receives the second connected information 76 from the acquisition unit 32L. The comparison unit 32M compares the data size between the first information 71 and the first authentication information 72 included in the received second connected information 76. The comparison unit 32M outputs to the second generation unit 32N, a comparison result expressing which one of the first information 71 and the first authentication information 72 has a smaller data size.

Depending on the method of generating the second authentication information 74 by the storage processing unit 32D, the second connected information 76 may include the pieces of first connected information 70. Specifically, as illustrated in FIG. 4A to FIG. 4E, in some cases, one piece of second authentication information 74 is generated for one piece of first connected information 70, and in other cases, one piece of second authentication information 74 is generated for the pieces of first connected information 70.

Back to FIG. 3, therefore, if the second connected information 76 includes the pieces of first connected information 70, the comparison unit 32M compares the data size between the first information 71 and the first authentication information 72 for each of the pieces of first connected information 70 included in the second connected information 76. Then, a comparison result expressing which one of the first information 71 and the first authentication information 72 has a smaller data size is output to the second generation unit 32N for each piece of first connected information 70.

The second generation unit 32N generates third authentication information to authenticate the first information 71, the first authentication information 72, the guarantee information 73, and the second authentication information 74, the second authentication information 74 being generated using the first information 71 or the first authentication information 72, the guarantee information 73, and the second authentication information 74.

Specifically, the second generation unit 32N receives the second connected information 76 from the acquisition unit 32L. The second generation unit 32N receives from the comparison unit 32M, the comparison result expressing which one of the first information 71 and the first authentication information 72 has the smaller data size in regard to the first connected information 70 included in the second connected information 76.

Then, the second generation unit 32N generates the third authentication information using one of the first information 71 and the first authentication information 72 that has the smaller data size in the first connected information 70, the guarantee information 73, and the second authentication information 74 which are included in the second connected information 76, and using second reference information 32K.

The third authentication information is one example of authentication information. The second reference information 32K is one example of reference information. Since the authentication information and the reference information are described above, the description is omitted here. Note that the GW 10 may have the second reference information 32K stored in the internal memory 32C in advance. The second generation unit 32N may read the second reference information 32K from the internal memory 32C, and use the read information to generate the third authentication information.

Alternatively, the second generation unit 32N may generate the third authentication information using the compressed value 75 of one of the first information 71 and the first authentication information 72 that has the smaller data size in the first connected information 70 included in the second connected information 76, or the compressed value 75 of the one that has the smaller data size and the guarantee information 73, in a manner similar to the first generation unit 32H.

Specifically, the second generation unit 32N may generate the third authentication information using one of the first information 71 and the first authentication information 72 that has the smaller data size in each of the pieces of first connected information 70, the guarantee information 73 for the pieces of first connected information 70, and the second authentication information 74 (see FIG. 4B), which are included in the second connected information 76, and using the second reference information 32K.

Alternatively, the second generation unit 32N may generate the third authentication information using the compressed value 75 of one of the first information 71 and the first authentication information 72 that has the smaller data size in each of the pieces of first connected information 70, the guarantee information 73 added to the pieces of first connected information 70, and the second authentication information 74 (see FIG. 4C), which are included in the second connected information 76, and using the second reference information 32K.

Still alternatively, the second generation unit 32N may generate the third authentication information using: one of the first information 71 and the first authentication information 72 that has the smaller data size included in each of the pieces of first connected information 70, the pieces of guarantee information 73 respectively corresponding to the pieces of first connected information 70, and the second authentication information 74 (see FIG. 4D), which are included in the second connected information 76, and using the second reference information 32K.

Still alternatively, the second generation unit 32N may generate the third authentication information using the compressed value 75 of one of the first information 71 and the first authentication information 72 that has the smaller data size in each of the pieces of first connected information 70 and the pieces of guarantee information 73 respectively corresponding to the pieces of first connected information 70, and the second authentication information 74 (see FIG. 4E), which are included in the second connected information 76, and using the second reference information 32K.

As described above, the time of generating the authentication information is longer as the data based on which authentication information is generated has longer data length. Therefore, it is preferable that the second generation unit 32N generates the second authentication information 74 using: one of the first information 71 and the first authentication information 72 that has the smaller data size in the first connected information 70; or the compressed value 75. This enables the second generation unit 32N to generate the third authentication information in a shorter time.

The second generation unit 32N generates the third authentication information using the first information 71 or the first authentication information 72, the guarantee information 73, and the second authentication information 74. Therefore, the second generation unit 32N can generate the third authentication information for the data whose anteroposterior relation of the reception in the GW 10 is guaranteed.

Next, the output control unit 328 is described. The output control unit 322 outputs the third connected information to the communication module 50 through the output unit 32B. Specifically, the output control unit 32P outputs the third connected information to the output unit 32B. The output unit 32B outputs to the communication module 50, the third connected information received from the output control unit 32P.

The third connected information includes the first information 71, the first authentication information 72, the guarantee information 73, the second authentication information 74, and the third authentication information.

The first authentication information 72 included in the third connected information authenticates the first information 71 included in the third connected information. The second authentication information 74 included in the third connected information authenticates the first information 71 or the first authentication information 72 and the guarantee information 73. The third authentication information included in the third connected information authenticates the first information 71 or the first authentication information 72, the guarantee information 73, and the second authentication information 74 included in the third connected information.

Therefore, the output control unit 32P can output to the communication module 50 through the output unit 32B, the third connected information including the pieces of authentication information to authenticate the data included in the third connected information in stages (first authentication information 72, second authentication information 74, and third authentication information), the first information 71 output from the ECU 20, and the guarantee information 73 added in the addition unit 32G.

Communication Module 50

Next, the communication module 50 is described. The communication module 50 includes a reception unit 50A, a third generation unit 50B, an output unit 50C, and an internal memory 50D.

These units are connected so as to exchange data and signals with each other. These units are achieved by, for example, one or a plurality of processors.

The reception unit 50A receives the third connected information from the GW 10. The third generation unit 50B generates fourth authentication information to authenticate the first information 71 or the first authentication information 72, the guarantee information 73, the second authentication information 74, and the third authentication information that are included in the third connected information received in the reception unit 50A, by using these pieces of information.

The fourth authentication information is one example of authentication information. For example, the third generation unit 50B has third reference information 50E stored in advance in the internal memory 50D. The third reference information 50E is one example of reference information. The third generation unit 50B may read the third reference information 50E from the internal memory 50D, and use the read information to generate the fourth authentication information.

The third generation unit 50B may extract one of the first information 71 and the first authentication information 72 that has the smaller data size for each piece of first connected information 70 included in the third connected information, and use the extracted pieces of information to generate the fourth authentication information, in a manner similar to the first generation unit 32H and the second generation unit 32N. The third generation unit 50B may alternatively generate the fourth authentication information using: one of the first information 71 and the first authentication information 72 that has the smaller data size in each of the pieces of first connected information 70 included in the third connected information and the guarantee information; the compressed value of the one that has the smaller data size; the one that has the smaller data size and each piece of guarantee information of the one that has the smaller data size; or the compressed value 75 of the one that has the smaller data size and each piece of guarantee information of the one that has the smaller data size, and this is similar to the first generation unit 32H and the second generation unit 32N (also see FIG. 4A to FIG. 4E).

In this manner, it is preferable that the third generation unit 50B generates the fourth authentication information using: one of the first information 71 and the first authentication information 72 that has the smaller data size in the first connected information 70; or the compressed value 75. This enables the third generation unit 50B to generate the fourth authentication information in a shorter time.

The third generation unit 50B generates the fourth authentication information using the first information 71 or the first authentication information 72, the guarantee information 73, the second authentication information 74, and the third authentication information. Therefore, the third generation unit 50B can generate the fourth authentication information for the data whose anteroposterior relation of the reception in the GW 10 is guaranteed.

The output unit 50C outputs to an external device through the external network 26, fourth connected information including the third connected information received in the reception unit 50A and the fourth authentication information received from the third generation unit 50B. The fourth connected information includes the first information 71, the first authentication information 72, the guarantee information 73, the second authentication information 74, the third authentication information, and the fourth authentication information.

That is to say, the communication module 50 outputs to an external device, the first information 71, the first authentication information 72 to authenticate the first information 71, the guarantee information 73, the second authentication information 74 to authenticate the first information 71 or the first authentication information 72 and the guarantee information 73, the third authentication information to authenticate these, and the fourth authentication information to authenticate these.

Therefore, by analyzing the fourth connected information including the guarantee information 73, the external device can analyze the data whose anteroposterior relation of the reception in the GW 10 is guaranteed.

In addition, by verifying the first authentication information 72 included in the fourth connected information, the external device can verify whether the first information 71 is altered at a stage of communication between the ECU 20 and the GW 10 or at any stage on all the routes between the ECU 20 and the external device. Furthermore, by verifying the second authentication information 74 included in the fourth connected information, the external device can verify whether the first information 71 or the first authentication information 72 and the guarantee information 73 are altered between the storage processing unit 32D and the storage unit 36 and between the storage unit 36 and the output processing unit 32E. In addition, by verifying the third authentication information included in the fourth connected information, the external device can verify whether the first information 71 or the first authentication information 72, the guarantee information 73, and the second authentication information 74 are altered at a stage of communication between the GW 10 and the communication module 50. Furthermore, by verifying the fourth authentication information included in the fourth connected information, the external device can verify whether the first information 71 or the first authentication information 72, the guarantee information 73, the second authentication information 74, and the third authentication information are altered at a stage of communication between the communication module 50 and the external device.

Thus, the information processing system 1 and the GW 10 in the present embodiment can provide the data whose anteroposterior relation is guaranteed by the guarantee information 73 and which can be easily verified as to whether the pieces of data are altered at each stage of the communication in the information processing system 1 and each stage of the communication from the information processing system 1 to the external device.

Figure 6:
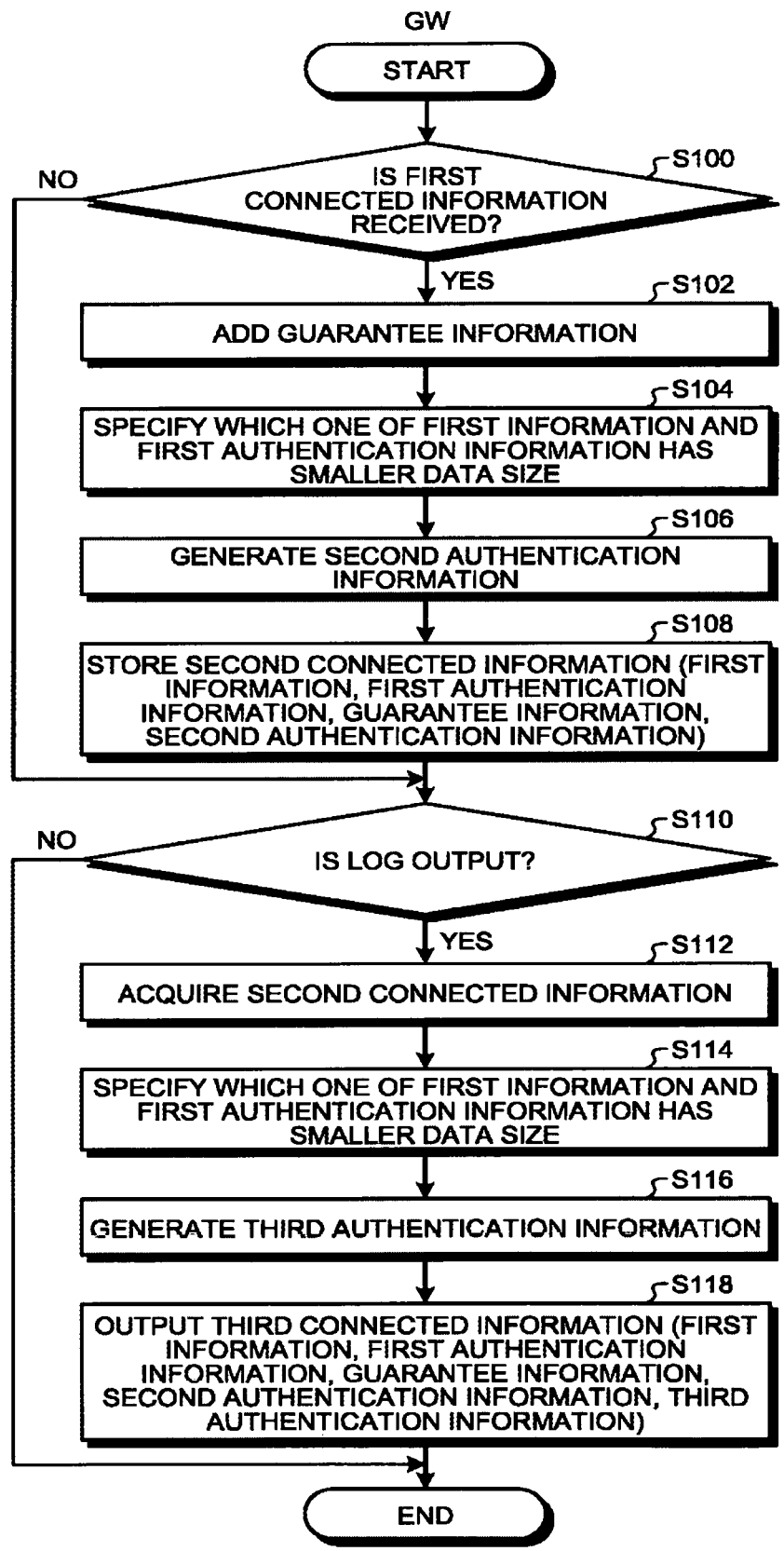
FIG. 6 is a flowchart illustrating a procedure of information processing in the GW.

Next, an example of a procedure of information processing in the GW 10 is described. FIG. 6 is a flowchart illustrating an example of the procedure of the information processing in the GW 10.

First, the reception unit 32A determines whether the first connected information 70 is received from the ECU 20 (Step S100). If it is not received at Step S100 (No at Step S100), the flow proceeds to Step S110 to be described below. If it is received at Step S100 (Yes at Step S100), the flow proceeds to Step S102.

At Step S102, the addition unit 32G adds the guarantee information 73 to the first connected information 70 received at Step S100 (Step S102).

Next, the comparison unit 32F compares the data size between the first information 71 and the first authentication information 72 included in the first connected information 70 received at Step S100, and specifies which one of them has the smaller data size (Step S104).

Next, the first generation unit 32H generates the second authentication information 74 to authenticate the first information 71 or the first authentication information 72 included in the first connected information 70 received at Step S100 and the guarantee information 73 that is added at Step S102 (Step S106). At Step S106, the first generation unit 32H generates the second authentication information 74 using one of the first information 71 and the first authentication information 72 that has the smaller data size in the first connected information 70 received at Step S100, which is specified at Step S104, the guarantee information 73 which is added at Step S102, and the first reference information 32J.

Next, the storage control unit 32I causes the storage unit 36 to store the second connected information 76 (Step S108). Specifically, the storage control unit 32I causes the storage unit 36 to store the second connected information 76 in which the first connected information 70 received at Step S100 (first information 71, first authentication information 72), the guarantee information 73 added at Step S102, and the second authentication information 74 generated at Step S106 are associated with each other.

Next, the output processing unit 32E determines whether to output the log (Step S110). That is to say, the output processing unit 32E determines whether to control to output the second connected information 76 stored in the storage unit 36 to the external device at Step S110. As described above, for example, the output processing unit 32E performs the determination at Step S110 by determining whether a predetermined condition is satisfied.

If the log is not output at Step S110 (No at Step S110), the present routine ends. If the log is output at Step S110 (Yes at Step S110), the flow proceeds to Step S112.

At Step S112, the acquisition unit 32L acquires the second connected information 76 from the storage unit 36 (Step S112).

Next, the comparison unit 32M compares the data size between the first information 71 and the first authentication information 72 included in the second connected information 76 acquired at Step S112, and specifies which one of them has the smaller data size (Step S114).

Next, the second generation unit 32N generates the third authentication information using the second connected information 76 acquired at Step S112 (first information 71 or first authentication information 72, guarantee information 73, and second authentication information 74), and the second reference information 32K (Step S116).

Next, the output control unit 32P outputs the third connected information to the communication module 50 through the output unit 32B (Step S118). That is to say, the output control unit 32P outputs the third connected information including the first information 71, the first authentication information 72, the guarantee information 73, the second authentication information 74, and the third authentication information. Then, the present routine ends.

Figure 7:
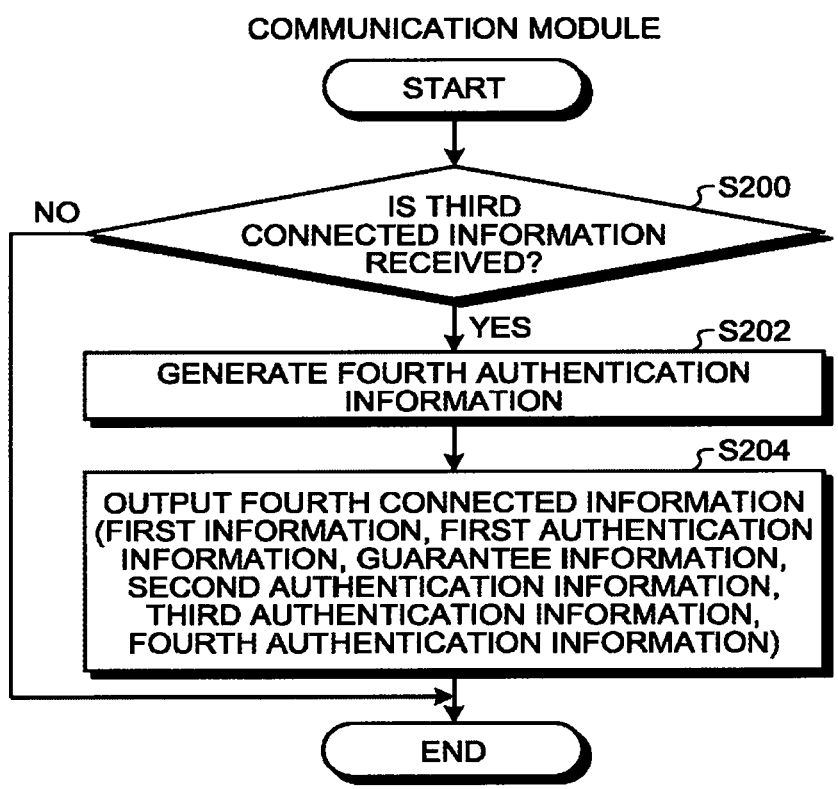
FIG. 7 is a flowchart illustrating a procedure of information processing in the communication module.

Next, one example of information processing in the communication module 50 is described. FIG. 7 is a flowchart illustrating one example of a procedure of information processing in the communication module 50. Note that FIG. 7 illustrates one example of the procedure of information processing when the communication module 50 outputs data to the external device.

First, the reception unit 50A determines whether the third connected information is received from the GW 10 (Step S200). If it is not received at Step S200 (No at Step S200), the present routine ends. If it is received at Step S200 (Yes at Step S200), the flow proceeds to Step S202.

At Step S202, the third generation unit 50B generates the fourth authentication information (Step S202). The third generation unit 50B generates the fourth authentication information to authenticate one of the first information 71 or the first authentication information 72 that has the smaller data size, the guarantee information 73, the second authentication information 74, and the third authentication information that are included in the third connected information received at Step S200, by using these pieces of information.

Next, the output unit 50C outputs the fourth connected information to the external device (Step S204). At Step S204, the output unit 50C outputs to an external device, the fourth connected information including the third connected information received at Step S200 (first information 71, first authentication information 72, guarantee information 73, second authentication information 74, and third authentication information) and the fourth authentication information generated at Step S202. Then, the present routine ends.

As described above, the GW 10 according to the present embodiment includes the reception unit 32A, the addition unit 32G, and the first generation unit 32H. The reception unit 32A receives the first connected information 70 including the first information 71 and the first authentication information 72 to authenticate the first information 71. The addition unit 32G adds to the first connected information 70, the guarantee information 73 for the anteroposterior relation of the reception of the first connected information 70. The first generation unit 32H generates the second authentication information 74 to authenticate the first information 71 or the first authentication information 72 and the guarantee information 73 using the first information 71 or the first authentication information 72 and the guarantee information 73.

Thus, in the GW 10 according to the present embodiment, the addition unit 32G adds the guarantee information 73 to guarantee the anteroposterior relation of the reception of the first connected information 70 to the first connected information 70 received in the reception unit 32A. That is to say, to the first connected information 70 transmitted from each of the ECUs 20 included in the information processing system 1, the guarantee information 73 to guarantee the anteroposterior relation of the reception with respect to another data is added on the GW 10 side. Therefore, to each piece of the first connected information 70, the guarantee information 73 added based on the common standard in the information processing system 1 and having the anteroposterior relation guaranteed is added.

The first generation unit 32H generates the second authentication information 74, the second authentication information 74 being generated using the first information 71 or the first authentication information 72 included in the first connected information 70 with the anteroposterior relation of the reception guaranteed by the guarantee information 73, and the guarantee information 73. Therefore, the first generation unit 32H can generate the second authentication information 74 for the data with the anteroposterior relation of the reception guaranteed.

That is to say, when the reception unit 32A receives the first connected information 70 from each of the ECUs 20 connected to the different sub-networks, the first generation unit 32H can generate the second authentication information 74 using the first connected information 70 with the integrity of the reception order guaranteed, by using the guarantee information 73 that is added by the addition unit 32G.

Moreover, the second authentication information 74 authenticates the first information 71 or the first authentication information 72 and the guarantee information 73. That is to say, the first generation unit 32H generates the second authentication information 74 that can verify that the first information 71 or the first authentication information 72 and the guarantee information 73 are not altered.

Therefore, for example in the external device, by verifying the first authentication information 72, whether the first information 71 is altered at the stage of communication between the ECU 20 and the GW 10 or among the GW 10, the storage unit 36 in the GW 10, the communication module 50, and the external device. In addition, by verifying the second authentication information 74, the external device can verify whether the first information 71 or the first authentication information 72 and the guarantee information 73 are altered between the storage processing unit 42D and the storage unit 46 and between the storage unit 46 and the output processing unit 42E.

That is to say, the GW 10 according to the present embodiment can provide the data whose anteroposterior relation of the reception of the first connected information 70 is guaranteed and whose alteration can be easily verified.

Thus, the GW 10 according to the present embodiment can provide the data that can achieve the efficient analysis.

Second Embodiment

The present embodiment will describe a case in which a result of verifying authentication information is generated in addition to the authentication information.

Figure 8:
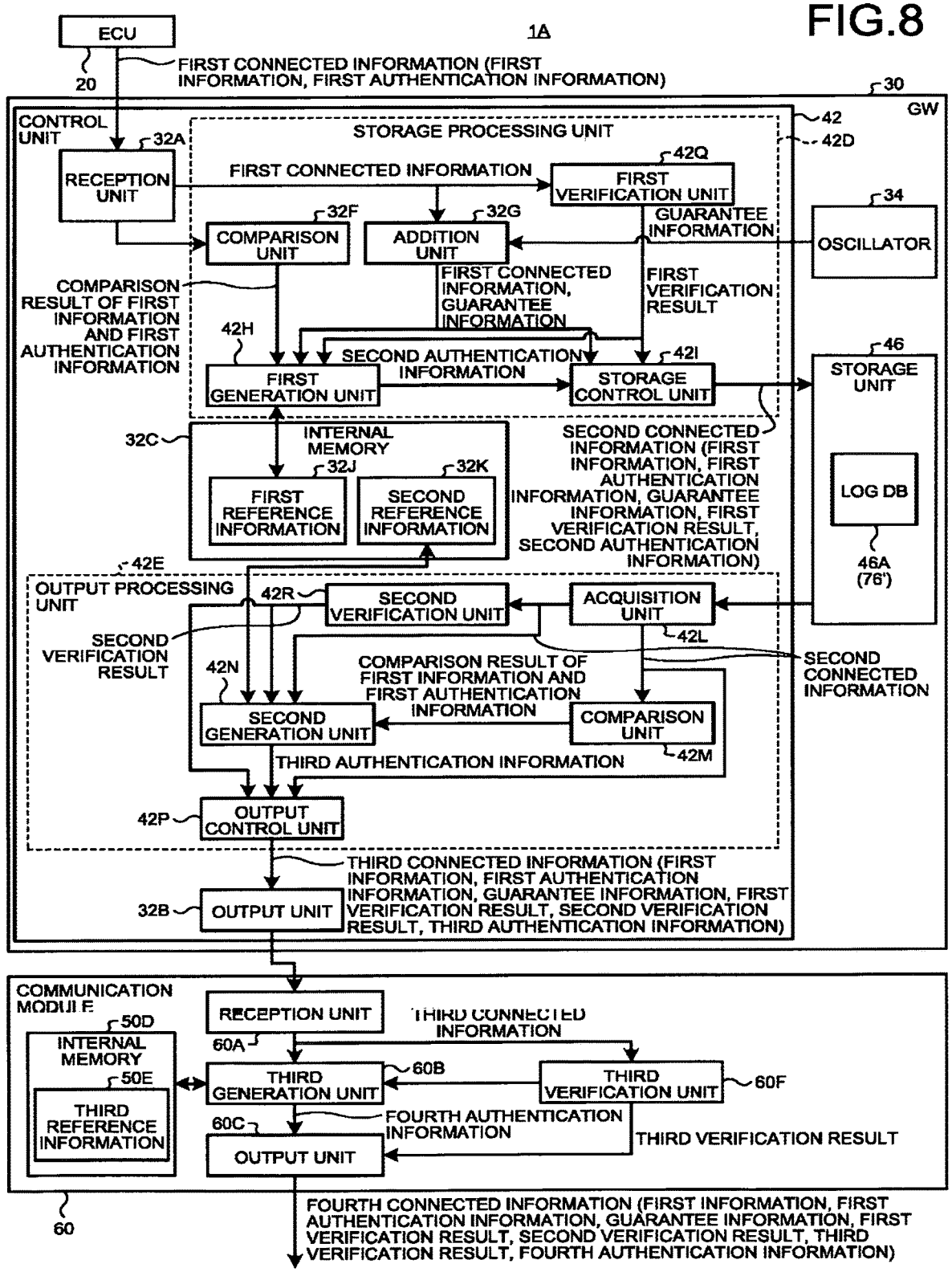
FIG. 8 is a block diagram illustrating a functional structure example of a GW and a communication module.

FIG. 8 is a schematic diagram illustrating a summary of an information processing system 1A according to the present embodiment. The information processing system 1A is mounted on, for example, the vehicle 2.

The information processing system 1A includes a GW 30 and a plurality of ECUs 20. The ECUs 20 and the GW 30 are connected through a plurality of sub-networks (sub-network N1, sub-network N2). To the GW 30, a communication module 60 is connected. The communication module 60 is a module to communicate with an external device through the external network 26.

That is to say, the information processing system 1A is different from the information processing system 1 according to the first embodiment in that the GW 30 and the communication module 60 are provided instead of the GW 10 and the communication module 50. Note that the hardware structure of the GW 30 and the communication module 60 is similar to that of the GW 10 and the GW 30 according to the first embodiment (see FIG. 2).

Next, a functional structure of the GW 30 and the communication module 60 is described. FIG. 8 is a block diagram illustrating a functional structure example of the GW 30 and the communication module 60.

GW 30

First, the GW 30 is described. The GW 30 includes a control unit 42, the oscillator 34, and a storage unit 46. The oscillator 34 and the storage unit 46, and the control unit 42 are connected so as to exchange data and signals with each other. The oscillator 34 is similar to that of the first embodiment.

The storage unit 46 stores various pieces of information therein. The storage unit 46 corresponds to one example of storage units. The storage unit 46 is, for example, achieved by the ST 18 (see FIG. 2). In the present embodiment, the storage unit 46 stores a log DB 46A therein (the details will be described below).

The control unit 42 incorporates a computer system as an integrated circuit, and performs various controls in accordance with programs (software) that operate on the computer system. The control unit 42 includes the reception unit 32A, the output unit 32B, the internal memory 32C, a storage processing unit 42D, and an output processing unit 42E. The reception unit 32A, the output unit 32B, and the internal memory 32C are similar to those of the first embodiment.

The storage processing unit 42D includes the comparison unit 32F, the addition unit 32G, a first generation unit 42H, a storage control unit 42I, and a first verification unit 42Q. The output processing unit 42E includes an acquisition unit 42L, a comparison unit 42M, a second generation unit 42N, an output control unit 42P, and a second verification unit 42R.

These units are achieved by, for example, one or a plurality of processors. For example, each of these units may be achieved by having a processor such as the CPU 11 execute programs, that is, by software. In another example, each unit may be achieved by a processor such as a dedicated IC, that is, by hardware. Alternatively, each unit may be achieved by using both software and hardware. In the case of using a plurality of processors, each processor may achieve one of these units, or two or more units.

The reception unit 32A receives the first connected information 70 from the ECU 20. The reception unit 32A outputs the first connected information 70 to the comparison unit 32F, the addition unit 32G, and the first verification unit 42Q. The comparison unit 32F and the addition unit 32G are similar to those of the first embodiment.

The first verification unit 42Q derives a first verification result of the first authentication information 72. That is to say, the first verification unit 42Q verifies the first authentication information 72 included in the first connected information 70 received from the reception unit 32A, and derives the first verification result.

Specifically, the first verification unit 42Q verifies the first authentication information 72 using a verification method in accordance with the kind of the first authentication information 72, so as to verify whether the first information 71 authenticated by the first authentication information 72 is altered.

Note that the first verification unit 42Q may verify the first authentication information 72 using a known verification method. For example, when the first authentication information 72 is a MAC, the first verification unit 42Q acquires a common key as reference information used in the verification. The common key may be stored in advance in the storage unit 46 or the internal memory 32C.

Then, the first verification unit 42Q calculates the MAC using the acquired common key and the first information 71 included in the first connected information 70 received from the reception unit 32A. When the calculated MAC and the MAC as the first authentication information 72 included in the first connected information 70 received from the reception unit 32A coincide, the verification result is determined to be normal, and when the MACs do not coincide, the verification result is determined to be abnormal. Then, the first verification unit 42Q derives the first verification result expressing that the verification result for the first authentication information 72 is normal or abnormal.

Note that when the first authentication information 72 is other than the MAC (for example, random number, counter value, or digital signature), the first verification unit 42Q may similarly verify the first authentication information 72 and derive the first verification result by a known verification method.

The first verification unit 42Q outputs the first verification result to the first generation unit 42H and the storage control unit 42I.

The first generation unit 42H generates the second authentication information using the first information 71 or the first authentication information 72, the guarantee information 73, and the first verification result. The second authentication information is the authentication information to authenticate the first information 71 or the first authentication information 72, the guarantee information 73, and the first verification result. That is to say, the first generation unit 42H is different from the first generation unit 32H in the first embodiment in that the first generation unit 42H generates the second authentication information using the first verification result in addition to the first information 71 or the first authentication information 72, and the guarantee information 73.

Specifically, the first generation unit 42H receives the result of comparing the data size between the first information 71 and the first authentication information 72 included in the first connected information 70 received in the reception unit 32A from the comparison unit 32F. The first generation unit 42H receives from the addition unit 32G, the first connected information 70 received in the reception unit 32A and the guarantee information 73 added to the first connected information 70. The first generation unit 42H receives the first verification result of the first authentication information 72 from the first verification unit 42Q.

The first generation unit 42H generates the second authentication information using: one of the first information 71 and the first authentication information 72 that has a smaller data size in the first connected information 70, the first verification result, and the guarantee information 73.

A method of generating the second authentication information is specifically described. FIGS. 9A to 9E are diagrams illustrating examples of a method of generating second authentication information 74'.

Figure 9:
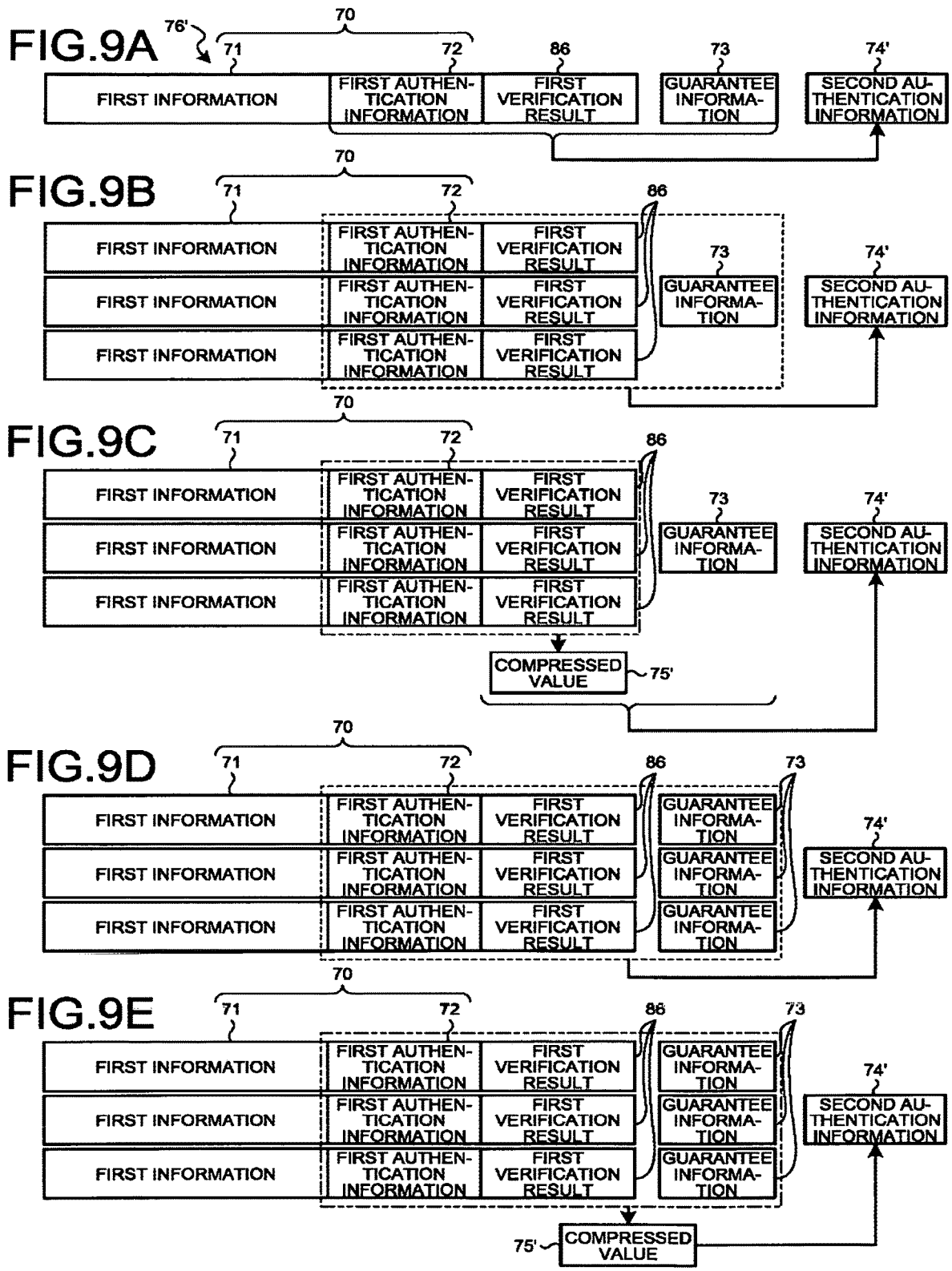
FIG. 9A to FIG. 9E are diagrams each describing a method of generating second authentication information.

FIG. 9A illustrates one example of a method of generating the second authentication information 74' in a case where the addition unit 32G adds one piece of guarantee information 73 to one piece of first connected information 70. For example, the first generation unit 42H generates the second authentication information 74' using the first authentication information 72 included in the first connected information 70, a first verification result 86 of the first authentication information 72, the guarantee information 73 for the first connected information 70, and the first reference information 32J. The first reference information 32J is similar to that in the first embodiment.

It is preferable that the first generation unit 42H generates the second authentication information 74' using one of the first information 71 and the first authentication information 72 that has the smaller data size in the first connected information 70, the first verification result 86, and the guarantee information 73 as described above.

Next, description is made with reference to FIG. 9B and FIG. 9C. FIG. 9B and FIG. 9C illustrate examples of the method of generating the second authentication information 74' in a case where the addition unit 32G adds one piece of guarantee information 73 to the pieces of first connected information 70.

For example, the first generation unit 42H generates the second authentication information 74' using the first information 71 or the first authentication information 72 included in each of the pieces of first connected information 70, the first verification results 86 of the pieces of first authentication information 72, and one piece of guarantee information 73 added to the pieces of first connected information 70.

Specifically, as illustrated in FIG. 9B, the first generation unit 42H generates the second authentication information 74' using the first authentication information 72 included in each of the pieces of first connected information 70, the first verification results 86 of the pieces of first authentication information 72, the guarantee information 73 added to the pieces of first connected information 70, and the first reference information 32J (see FIG. 8). It is preferable that the first generation unit 42H extracts one of the first information 71 and the first authentication information 72 that has the smaller data size from each of the pieces of first connected information 70, and uses the extracted pieces of information to generate the second authentication information 74'.

In another example, the first generation unit 42H may generate the second authentication information 74' using a compressed value 75' of the first information 71 or the first authentication information 72 included in each of the pieces of first connected information 70, and a plurality of first verification results 86, and using one piece of guarantee information 73 added to the pieces of first connected information 70.

Specifically, as illustrated in FIG. 9C, the first generation unit 42H calculates the compressed value 75' of the first authentication information 72 in each of the pieces of first connected information 70 and the first verification results 86 of the pieces of first authentication information 72. That is to say, the first generation unit 42H calculates the compressed value 75' of the pieces of first authentication information 72 and the first verification results 86. The compressed value 75' is, for example, a hash value. When the compressed value 75' is a hash value, the first generation unit 42H may calculate the compressed value 75' (hash value) using the hash function from the pieces of first authentication information 72 and the first verification results 86.

Note that the first generation unit 42H may extract one of the first information 71 and the first authentication information 72 that has the smaller data size from each of the pieces of first connected information 70, and calculate the compressed value 75' using the extracted pieces of information and the first verification results 86.

The first generation unit 42H may generate the second authentication information 74' using the compressed value 75', the guarantee information 73 added to the pieces of first connected information 70, and the first reference information 32J (see FIG. 3).

Next, description is made with reference to FIG. 9D and FIG. 9E. FIG. 9D and FIG. 9E illustrate examples of the method of generating the second authentication information 74' in a case where the addition unit 32G adds a plurality of pieces of guarantee information 73 to a plurality of pieces of first connected information 70, respectively.

For example, the first generation unit 42H may generate the second authentication information 74' using the first information 71 or the first authentication information 72 in each of the pieces of first connected information 70, the first verification results 86 of the pieces of first authentication information 72, and the pieces of guarantee information 73 respectively corresponding to the pieces of first connected information 70.

Specifically, as illustrated in FIG. 9D, the first generation unit 42H generates the second authentication information 74' using the first authentication information 72 in each of the pieces of first connected information 70, the first verification results 86 of the pieces of first authentication information 72, the pieces of guarantee information 73 respectively corresponding to the pieces of first connected information 70, and the first reference information 32J (see FIG. 3). Alternatively, the first generation unit 42H may extract one of the first information 71 and the first authentication information 72 that has the smaller data size from each of the pieces of first connected information 70, and may use the extracted pieces of information to generate the second authentication information 74'.

In another example, the first generation unit 42H may generate the second authentication information 74' using the compressed value 75' of the first information 71 or the first authentication information 72 in each of the pieces of first connected information 70, the first verification results 86 of the pieces of first authentication information 72, and the pieces of guarantee information 73 respectively corresponding to the pieces of first connected information 70. Specifically, as illustrated in FIG. 9E, the first generation unit 42H calculates the compressed value 75' of the first authentication information 72 included in each of the pieces of first connected information 70, the first verification results 86 of the pieces of first authentication information 72, and the pieces of guarantee information 73 respectively corresponding to the pieces of first connected information 70. Alternatively, the first generation unit 42H may extract one of the first information 71 and the first authentication information 72 that has the smaller data size from each of the pieces of first connected information 70, and may use the extracted pieces of information to calculate the compressed value 75'.

The first generation unit 42H may generate the second authentication information 74' using the compressed value 75' and the first reference information 32J (see FIG. 3).

By generating the second authentication information 74' using one of the first information 71 and the first authentication information 72 that has the smaller data size or the compressed value 75', the first generation unit 42H can generate the second authentication information 74' in a shorter time.

Back to FIG. 8, the description is continued. The storage control unit 42I is one example of the first output control unit. The storage control unit 42I outputs second connected information 76'. The second connected information 76' includes the first information 71, the first authentication information 72, the guarantee information 73, the first verification result 86, and the second authentication information 74'. For example, the storage control unit 42I outputs the second connected information 76' to the storage unit 46. This causes the storage unit 46 to store the second connected information 76' therein. The output destination of the second connected information 76' is not limited to the storage unit 46. For example, the storage control unit 42I may output the second connected information 76' directly to the output control unit 42P to be described below, without causing the storage unit 46 to store the second connected information 76' therein.

Specifically, the storage control unit 42I receives the second authentication information 74' from the first generation unit 42H. The storage control unit 42I receives the first connected information 70 (first information 71, first authentication information 72), and the guarantee information 73 from the addition unit 32G. The storage control unit 42I receives the first verification result 86 of the first authentication information 72 from the first verification unit 42Q.

Then, the storage control unit 42I causes the storage unit 46 to store therein, the second connected information 76' including the first information 71, the first authentication information 72, the guarantee information 73, the first verification result 86, and the second authentication information 74'.

Figure 10:
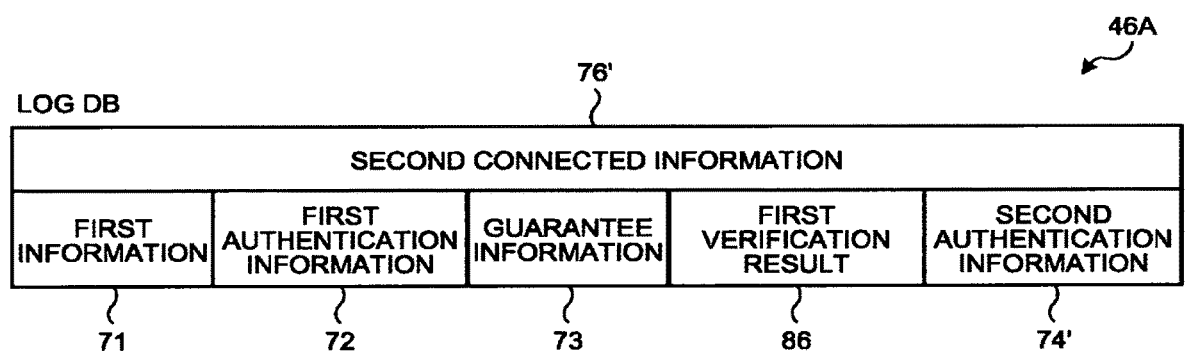
FIG. 10 is a schematic diagram illustrating a data structure of a log DB.

Specifically, the storage control unit 42I causes the storage unit 46 to store the second connected information 76' therein by registering the second connected information 76' in the log DB 46A. FIG. 10 is a schematic diagram illustrating one example of a data structure of the log DB 46A. The log DB 46A is a database for storing the second connected information 76' therein. Specifically, the log DB 46A is a database in which the first information 71, the first authentication information 72, the guarantee information 73, the first verification result 86, and the second authentication information 74' are associated with each other. The data structure of the log DB 46A is not limited to the database. For example, the data structure of the log DB 46A may be a table or the like.

Back to FIG. 8, the description is continued. Next, the output processing unit 42E is described.

The output processing unit 42E controls to output to the communication module 60 through the output unit 32B, the third connected information generated based on the second connected information 76' stored in the storage unit 46. The output processing unit 42E may control to output the second connected information 76' to the communication module 60 when a predetermined condition is satisfied.

For example, the output processing unit 42E may control to output to the communication module 60, the stored second connected information 76' every time the control unit 42 causes the storage unit 46 to store the second connected information 76' therein. In another example, the output processing unit 42E may control to output to the communication module 60, the second connected information 76' stored in the storage unit 46 for every predetermined time or every time the second connected information 76' with a predetermined data quantity is stored in the storage unit 46. In still another example, the output processing unit 42E may control to output to the communication module 60, the second connected information 76' stored in the storage unit 46 when a signal expressing a request to output a log is received through the communication module 60 from an external device or the like.

The output processing unit 42E includes the acquisition unit 42L, the comparison unit 42M, the second generation unit 42N, the output control unit 42P, and the second verification unit 42R. The acquisition unit 42L acquires the second connected information 76' from the storage unit 46. The acquisition unit 42L outputs the acquired second connected information 76' to the comparison unit 42M, the second generation unit 42N, and the second verification unit 42R.

The comparison unit 42M receives the second connected information 76' from the acquisition unit 42L. Then, the comparison unit 42M compares the data size between the first information 71 and the first authentication information 72 included in the received second connected information 76'. That is to say, the comparison unit 42M performs a process similar to that of the comparison unit 32M according to the first embodiment except that the comparison unit 42M compares the data size between the first information 71 and the first authentication information 72 included in the second connected information 76' instead of the second connected information 76. Then, the comparison unit 42M outputs to the second generation unit 42N, a comparison result expressing which one of the first information 71 and the first authentication information 72 has the smaller size.

The second verification unit 42R derives a second verification result of the second authentication information 74'. That is to say, the second verification unit 42R verifies the second authentication information 74' included in the second connected information 76', and derives the second verification result.

Specifically, the second verification unit 42R verifies the second authentication information 74' using a verification method in accordance with the kind of the second authentication information 74', so as to verify whether the data authenticated by the second authentication information 74' (first information 71 or first authentication information 72, guarantee information 73, and first verification result 86) is altered.

Note that the second verification unit 42R may verify the second authentication information 74' using a known verification method. For example, when the second authentication information 74' is a MAC, the second verification unit 42R acquires a common key as reference information used in the verification. The common key may be stored in advance in the storage unit 46 or the internal memory 32C.

Then, the second verification unit 42R calculates the MAC using the acquired common key and the first information 71, the first authentication information 72, the first verification result 86, and the guarantee information 73 which are included in the second connected information 76'. When the calculated MAC and the MAC as the second authentication information 74' included in the second connected information 76' coincide, the verification result is determined to be normal, and when the MACs do not coincide, the verification result is determined to be abnormal. Then, the second verification unit 42R derives the second verification result expressing that the verification for the second authentication information 74' is normal or abnormal.

Note that the second verification unit 42R may verify the second authentication information 74' and derive the second verification result by a verification method in accordance with the method of generating the second authentication information 74' by the first generation unit 42H (see FIG. 9A to FIG. 9E). When the second authentication information 74' is other than the MAC (for example, random number, counter value, or digital signature), the second verification unit 42R may similarly derive the second verification result by a known verification method in accordance with the method of generating the second authentication information 74' by the first generation unit 42H (see FIG. 9A to FIG. 9E).

The second verification unit 42R outputs the second verification result to the second generation unit 42N and the output control unit 42P.

The second generation unit 42N generates the third authentication information using the first information 71 or the first authentication information 72, the guarantee information 73, the first verification result, and the second verification result.

The third authentication information authenticates the first information 71 or the first authentication information 72, the guarantee information 73, the first verification result of the first authentication information 72, and the second verification result.

Specifically, the second generation unit 42N receives the second connected information 76' from the acquisition unit 42L. In addition, the second generation unit 42N receives from the comparison unit 42M, the comparison result expressing which one of the first information 71 and the first authentication information 72 has the smaller data size in regard to the first connected information 70 included in the second connected information 76'. Furthermore, the second generation unit 42N receives from the second verification unit 42R, the second verification result of the second authentication information 74' included in the second connected information 76'.

Then, the second generation unit 42N generates the third authentication information using: one of the first information 71 and the first authentication information 72 that has the smaller data size in the first connected information 70, the guarantee information 73, and the first verification result which are included in the second connected information 76'; the second verification result of the second authentication information 74'; and the second reference information 32K.

The third authentication information is one example of authentication information. The second reference information 32K is one example of reference information. Since the authentication information and the reference information are already described above, these are not described here.

Note that the second generation unit 42N may generate the third authentication information by a method below in a manner similar to the first generation unit 42H.

Specifically, the second generation unit 42N may generate the third authentication information using one of the first information 71 and the first authentication information 72 that has the smaller data size in each of the pieces of first connected information 70, the first verification results of the pieces of first authentication information 72, and one piece of guarantee information 73 added to the pieces of first connected information 70 (see FIG. 9B), which are included in the second connected information 76', and using the second verification result of the second authentication information 74', and using the second reference information 32K.

Alternatively, the second generation unit 42N may generate the third authentication information using the compressed value 75' of one of the first information 71 and the first authentication information 72 that has the smaller data size in each of the pieces of first connected information 70 and the first verification results 86, and one piece of guarantee information 73 added to the pieces of first connected information 70 (see also FIG. 9C), which are included in the second connected information 76', using the second verification result of the second authentication information 74', and using the second reference information 32K.

Still alternatively, the second generation unit 42N may generate the third authentication information using one of the first information 71 and the first authentication information 72 that has the smaller data size in each of the pieces of first connected information 70, the first verification results 86 of the pieces of first authentication information 72, and the pieces of guarantee information 73 respectively corresponding to the pieces of first connected information 70 (see also FIG. 9D), which are included in the second connected information 76', using the second verification result of the second authentication information 74', and using the second reference information 32K.

Still alternatively, the second generation unit 42N may generate the third authentication information using the compressed value 75', the second verification result of the second authentication information 74', and the second reference information 32K (see also FIG. 9E). The compressed value 75' is the compressed value of: one of the first information 71 and the first authentication information 72 that has the smaller data size in each of the pieces of first connected information 70; the first verification results 86 of the pieces of first authentication information 72; and the pieces of guarantee information 73 respectively corresponding to the pieces of first connected information 70, which are included in the second connected information 76'.

As described above, the time of generating the authentication information is longer as the data based on which authentication information is generated has longer data length. Therefore, it is preferable that the second generation unit 42N generates the third authentication information using one of the first information 71 and the first authentication information 72 that has the smaller data size, or the compressed value 75'. This enables the second generation unit 42N to generate the third authentication information in a shorter time.

Next, the output control unit 42P is described. The output control unit 42P outputs the third connected information to the communication module 60 through the output unit 32B. Specifically, the output control unit 42P outputs the third connected information to the output unit 32B. The output unit 32B outputs to the communication module 60, the third connected information received from the output control unit 42P.

The third connected information includes the first information 71, the first authentication information 72, the guarantee information 73, the first verification result, the second verification result, and the third authentication information.

Thus, it is preferable that the third connected information does not include the second authentication information 74'. This is because the second verification result of the second authentication information 74' is included in the third connected information. In addition, when the third connected information does not include the second authentication information 74', the amount of data to be output from the GW 30 to the communication module 60 can be reduced.

The first authentication information 72 included in the third connected information authenticates the first information 71 included in the third connected information. The first verification result included in the third connected information is the verification result of the first authentication information 72. The second verification result included in the third connected information is the verification result of the second authentication information 74'. The third authentication information included in the third connected information authenticates the first information 71 or the first authentication information 72, the guarantee information 73, the first verification result, and the second verification result.

Therefore, the output control unit 42P can output to the communication module 60 through the output unit 32B, the third connected information including the verification results of the authentication information that authenticates each piece of data included in the third connected information in stages (first verification result, second verification result), the first information 71 output from the ECU 20, the first authentication information 72 for the first information 71, the guarantee information 73 added in the addition unit 32G, and the third authentication information. The third authentication information authenticates the first information 71 or the first authentication information 72, the first verification result, the second verification result, and the guarantee information 73.

Communication Module 60

Next, the communication module 60 is described. The communication module 60 includes a reception unit 60A, a third generation unit 60B, an output unit 60C, the internal memory 50D, and a third verification unit 60F.

These units are connected so as to exchange data and signals with each other. These units are achieved by, for example, one or a plurality of processors.

The reception unit 60A receives the third connected information from the GW 30. The third verification unit 60F verifies the third authentication information included in the third connected information and derives a third verification result.

Specifically, the third verification unit 60F verifies the third authentication information using a verification method in accordance with the kind of the third authentication information, so as to verify whether data authenticated by the third authentication information (first information 71 or first authentication information 72, guarantee information 73, first verification result, and second verification result) is altered.

Note that the third verification unit 60F may verify the third authentication information using a known verification method. For example, when the third authentication information is a MAC, the third verification unit 60F acquires a common key as reference information used in the verification. The common key may be stored in advance in the internal memory 50D.

Then, the third verification unit 60F calculates the MAC using the acquired common key and the first information 71 or the first authentication information 72, the guarantee information 73, the first verification result, and the second verification result which are included in the third connected information. When the calculated MAC and the MAC as the third authentication information included in the third connected information coincide, the verification result is determined to be normal, and when the MACs do not coincide, the verification result is determined to be abnormal. Then, the third verification unit 60F derives the third verification result expressing that the verification result for the third authentication information is normal or abnormal.

Note that the third verification unit 60F may verify the third authentication information and derive the third verification result by a verification method in accordance with the method of generating the third authentication information by the second generation unit 42N. Note that when the third authentication information is other than the MAC (for example, random number, counter value, or digital signature), the third verification unit 60F may similarly generate the third authentication information by a known verification method in accordance with the method of generating the third authentication information by the second generation unit 42N.

The third verification unit 60F outputs the third verification result to the third generation unit 60B and the output unit 60C.

The third generation unit 60B generates the fourth authentication information to authenticate one of the first information 71 or the first authentication information 72 that has the smaller data size, the guarantee information 73, the first verification result, and the second verification result, which are included in the third connected information received in the reception unit 60A, and the third verification result received from the third verification unit 60F, by using these pieces of information.

The fourth authentication information is one example of authentication information. For example, the third generation unit 60B has the third reference information 50E stored in advance in the internal memory 50D. The third reference information 50E is one example of reference information. The third generation unit 60B may read the third reference information 50E from the internal memory 50D, and use the read information to generate the fourth authentication information.

Note that the third generation unit 60B may generate the fourth authentication information using one of the first information 71 and the first authentication information 72, included in the first connected information 70, that has the smaller data size for each first connected information 70 included in the third connected information, in a manner similar to the first generation unit 42H and the second generation unit 42N.

In a manner similar to the first generation unit 42H and the second generation unit 42N, the third generation unit 60B may generate the fourth authentication information using one of the first information 71 and the first authentication information 72 that has a smaller data size in each piece of first connected information 70, the first verification results 86 of the pieces of first authentication information 72, one piece of guarantee information 73 added to the pieces of first connected information 70, and the second verification result of the second authentication information 74' (see also FIG. 9B), which are included in each of the pieces of third connected information, using the third verification result received from the third verification unit 60F, and using the third reference information 50E.

Alternatively, the third generation unit 60B may generate the fourth authentication information using the compressed value 75' of one of the first information 71 and the first authentication information 72 that has the smaller data size in each of the pieces of first connected information 70, and the first verification results of the pieces of first authentication information 72, one piece of guarantee information 73 added to the pieces of first connected information 70, and the second verification result of the second authentication information 74' (see also FIG. 9C), which are included in the second connected information 76', using the third verification result received from the third verification unit 60F, and using and the third reference information 50E.

Still alternatively, the third generation unit 60B may generate the fourth authentication information using one of the first information 71 and the first authentication information 72 that has the smaller data size in each of the pieces of first connected information 70, the first verification results 86 of the pieces of first authentication information 72, the pieces of guarantee information 73 respectively corresponding to the pieces of first connected information 70, and the second verification result of the second authentication information 74' (see also FIG. 9D), which are included in the second connected information 76', using the third verification result received from the third verification unit 60F, and using the third reference information 50E.

Still alternatively, the third generation unit 60B may generate the fourth authentication information using the compressed value 75', the second verification result of the second authentication information 74', the third verification result received from the third verification unit 60F, and the third reference information 50E (see also FIG. 9E). The compressed value 75' is the compressed value of: one of the first information 71 and the first authentication information 72 that has the smaller data size in each of the pieces of first connected information 70; the first verification results 86 of the pieces of first authentication information 72; and the pieces of guarantee information 73 respectively corresponding to the pieces of first connected information 70 which are included in the second connected information 76'.

The output unit 60C outputs the fourth connected information to an external device through the external network 26. The fourth connected information includes: the first information 71, the first authentication information 72, the guarantee information 73, the first verification result, and the second verification result which are included in the third connected information received in the reception unit 60A; the third verification result derived in the third verification unit 60F; and the fourth authentication information generated in the third generation unit 60B.

It is preferable that the fourth connected information includes neither the second authentication information 74' nor the third authentication information. This is because the second verification result of the second authentication information 74' is included in the third connected information, and the third authentication result of the third authentication information is included in the fourth connected information. When the fourth connected information includes neither the second authentication information 74' nor the third authentication information, the amount of data to be output from the communication module 60 to the external device can be reduced.

In this manner, the output unit 60C outputs to the external device, the first information 71, the first authentication information 72 to authenticate the first information 71, the guarantee information 73, the first verification result of the first authentication information 72, the second verification result of the second authentication information 74, the third verification result of the third authentication information, and the fourth authentication information. The second authentication information 74' authenticates the first information 71 or the first authentication information 72, the guarantee information 73, and the first verification result. The third authentication information authenticates the first information 71 or the first authentication information 72, the guarantee information 73, the first verification result, and the second verification result. The fourth authentication information authenticates the first information 71 or the first authentication information 72, the guarantee information 73, the first verification result, the second verification result, and the third verification result.

Therefore, by analyzing the fourth connected information including the guarantee information 73, the external device can analyze the data whose anteroposterior relation of the reception in the GW 30 is guaranteed.

From the first verification result, the external device can determine whether the first information 71 is altered at a stage of the communication between the ECU 20 and the GW 30. From the second verification result, the external device can determine whether the first information 71 or the first authentication information 72, the guarantee information 73, and the first verification result are altered in the communication between the storage processing unit 42D and the storage unit 46, and between the storage unit 46 and the output processing unit 42E. From the third verification result, the external device can determine whether the first information 71 or the first authentication information 72, the guarantee information 73, the first verification result, and the second verification result are altered at a stage of the communication between the GW 30 and the communication module 60. By verifying the fourth authentication information included in the fourth connected information, the external device can verify whether the first information 71 or the first authentication information 72, the guarantee information 73, the first verification result, the second verification result, and the third verification result are altered at a stage of the communication between the communication module 60 and the external device.

If the first information 71 has a larger data size than the first authentication information 72 (i.e., if the subsequent authentication information is generated based on the first authentication information 72), the external device verifies the first authentication information 72 one last time. This enables the external device to verify whether the first information 71 is altered among the GW 30, the communication module 60, and the external device.

Thus, the information processing system 1A and the GW 30 in the present embodiment can provide the data whose anteroposterior relation is guaranteed by the guarantee information 73 and which can be easily verified as to whether the pieces of data are altered at each stage of the communication in the information processing system 1A and the stage of the communication from the information processing system 1A to the external device.

Thus, since the information processing system 1A and the GW 30 provide the verification result of the authentication information to the external device, the data that can achieve the efficient analysis can be provided in addition to the effect of the first embodiment.

Figure 11:
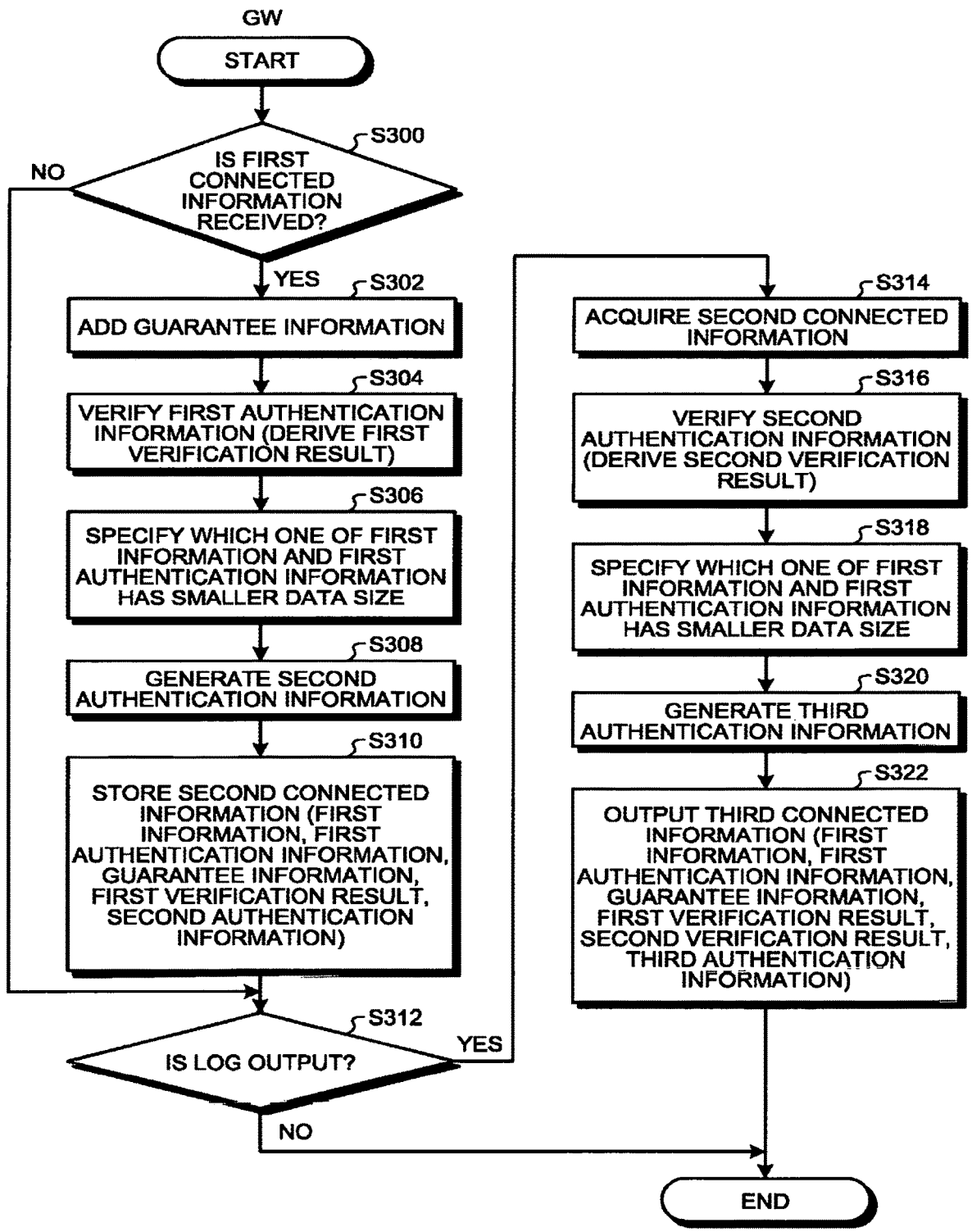
FIG. 11 is a flowchart illustrating a procedure of information processing in the GW.

Next, one example of a procedure of image processing in the GW 30 is described. FIG. 11 is a flowchart illustrating one example of the procedure of information processing in the GW 30.

First, the reception unit 32A determines whether the first connected information 70 is received from the ECU 20 (Step S300). If it is not received at Step S300 (No at Step S300), the process proceeds to Step S312. If it is received at Step S300 (Yes at Step S300), the process proceeds to Step S302.

At Step S302, the addition unit 32G adds the guarantee information 73 to the first connected information 70 received at Step S300 (Step S302).

Next, the first verification unit 42Q verifies the first authentication information 72 included in the first connected information 70 received at Step S300 and derives the first verification result (Step S304).

Next, the comparison unit 32F compares the data size between the first information 71 and the first authentication information 72 included in the first connected information 70 received at Step S300, and specifies one of them that has the smaller data size (Step S306).

Next, the first generation unit 42H generates the second authentication information 74' using the first information 71 or the first authentication information 72 included in the first connected information 70 received at Step S300, the guarantee information 73, and the first verification result derived at Step S304 (Step S308).

Next, the storage control unit 42I causes the storage unit 46 to store therein, the second connected information 76' including the first information 71 and the first authentication information 72 in the first connected information 70 received at Step S300, the guarantee information 73, the first verification result derived at Step S304, and the second authentication information 74' generated at Step S308 (Step S310).

Next, the output processing unit 42E determines whether to output the log (Step S312). That is to say, the output processing unit 42E determines whether to control to output the second connected information 76' stored in the storage unit 46 to the external device at Step S310. As described above, for example, the output processing unit 42E performs the determination at Step S312 by determining whether a predetermined condition is satisfied.

If the log is not output at Step S312 (No at Step S312), the present routine ends. If the log is output at Step S312 (Yes at Step S312), the process proceeds to Step S314.

At Step S314, the acquisition unit 42L acquires the second connected information 76' from the storage unit 46 (Step S314).

Next, the second verification unit 42R verifies the second authentication information 74' included in the second connected information 76' acquired at Step S314, and derives the second verification result (Step S316).

Next, the comparison unit 42M compares the data size between the first information 71 and the first authentication information 72 included in the second connected information 76' acquired at Step S314, and specifies one of them that has the smaller data size (Step S318).

Next, the second generation unit 42N generates the third authentication information using: the first information 71 or the first authentication information 72, the guarantee information 73, and the first verification result which are included in the second connected information 76' acquired at Step S314; and the second verification result (Step S320).

Next, the output control unit 42P outputs the third connected information to the communication module 60 through the output unit 32B (Step S322). That is to say, the output control unit 42P outputs the third connected information including the first information 71, the first authentication information 72, the guarantee information 73, the first verification result, the second verification result, and the third authentication information. Then, the present routine ends.

Next, one example of the information processing in the communication module 60 is described. FIG. 12 is a flowchart illustrating one example of the procedure of information processing in the communication module 60. Note that FIG. 12 illustrates one example of the procedure of the information processing when the communication module 60 outputs the data to the external device.

First, whether the third connected information is received in the reception unit 60A from the GW 30 is determined (Step S400). If it is not received at Step S400 (No at Step S400), the present routine ends. If it is received at Step S400 (Yes at Step S400), the process proceeds to Step S402.

At Step S402, the third verification unit 60F verifies the third authentication information included in the third connected information received at Step S400, and derives the third verification result (Step S402).

The third generation unit 60B generates the fourth authentication information to authenticate one of the first information 71 and the first authentication information 72 that has the smaller data size, the guarantee information 73, the first verification result, and the second verification result which are included in the third connected information received at Step S400, and the third verification result derived at Step S402, by using these pieces of information (Step S404).

Next, the output unit 60C outputs the fourth connected information to the external device through the external network 26 (Step S406). The fourth connected information includes the first information 71, the first authentication information 72, the guarantee information 73, the first verification result, and the second verification result which are included in the third connected information received at Step S400, the third verification result derived at Step S402, and the fourth authentication information generated at Step S404. Then, the present routine ends.

As described above, in the information processing system 1A and the GW 30 according to the present embodiment, the fourth connected information including the verification results (first verification result, second verification result, and third verification result) of the authentication information (first authentication information 72, second authentication information 74', and third authentication information) is output.

Therefore, by acquiring the first verification result, the second verification result, and the third verification result or verifying the fourth authentication information, the external device can verify that each of the first information 71 or the first authentication information 72, the guarantee information 73, the first verification result, the second verification result, and the third verification result is not altered in each route.

Note that by using the first information 71 in the first information 71 and the first authentication information 72, the subsequent second, third, and fourth authentication information may be generated. In this case, it is easy to analyze whether the first information 71 whose anteroposterior relation of the reception with respect to another first connected information 70 is guaranteed by the guarantee information 73, each piece of data included in the second connected information 76', and each piece of data included in the third connected information are altered.

In a case where the subsequent second, third, and fourth authentication information is generated by using the first authentication information 72 in the first information 71 and the first authentication information 72, whether the first information 71 whose anteroposterior relation of the reception with respect to another first connected information 70 is guaranteed by the guarantee information 73, each piece of data included in the second connected information 76', and each piece of data included in the third connected information are altered can be easily analyzed by verifying the first authentication information 72 in the external device again.

Thus, since the information processing system 1A and the GW 30 according to the present invention provide the verification result of the authentication information to the external device, the data that can achieve the efficient analysis can be provided in addition to the effect of the first embodiment.

Remarks

The programs for executing the processes in the GW 10, the GW 30, the communication module 50, and the communication module 60 may be stored in a hard disk drive (HDD). Alternatively, the programs for executing the processes in the GW 10, the GW 30, the communication module 50, and the communication module 60 may be provided by being incorporated in advance in the ROM 12 (see also FIG. 2).

The programs for executing the processes in the GW 10, the GW 30, the communication module 50, and the communication module 60 may be stored in a computer readable storage medium such as a CD-ROM, a CD-R, a memory card, a digital versatile disc (DVD), or a flexible disk (FD) in the installable format or the executable format, and provided as a computer program product. The programs for executing the processes in the GW 10, the GW 30, the communication module 50, and the communication module 60 may be stored in a computer connected to the network such as the Internet, and downloaded via the network. Alternatively, the programs for executing the processes in the GW 10, the GW 30, the communication module 50, and the communication module 60 may be provided or distributed via the network such as the Internet.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
receive first connected information including first information and first authentication information to authenticate the first information;
add, to the first connected information, guarantee information to guarantee an anteroposterior relation between reception of the first connected information and reception of another data;
generate second authentication information to authenticate the first information, the guarantee information, and the first authentication information, the second authentication information being generated using the first information or the first authentication information and using the guarantee information; and
output second connected information in which the first information, the first authentication information, the guarantee information, and the second authentication information are associated with each other.

2. The information processing device according to claim 1, wherein the one or more processors are configured to output the second connected information to a storage.

3. The information processing device according to claim 1, wherein the one or more processors are configured to generate the second authentication information using:
the guarantee information; and
either the first information or the first authentication information, which has a smaller data size.

4. The information processing device according to claim 1, wherein the first authentication information is a message authentication code, a random number, a counter value, a hash function, or a digital signature.

5. The information processing device according to claim 1, wherein the first authentication information is a message authentication code.

6. The information processing device according to claim 1, wherein the guarantee information is time information in regard to the reception of the first connected information.

7. The information processing device according to claim 1, wherein the guarantee information is count information in regard to the reception of the first connected information.

8. The information processing device according to claim 1, further comprising an oscillator configured to oscillate a clock signal, wherein
the one or more processors are configured to add, to the first connected information, the guarantee information in accordance with the clock signal oscillated from the oscillator.

9. The information processing device according to claim 1, wherein the one or more processors are configured to:
add one piece of the guarantee information to a plurality of pieces of the first connected information, and
generate the second authentication information using the first information or the first authentication information included in each of the pieces of the first connected information, and using the one piece of the guarantee information added to the pieces of the first connected information.

10. The information processing device according to claim 1, wherein the one or more processors are configured to:
add one piece of the guarantee information to a plurality of pieces of the first connected information, and
generate the second authentication information using a compressed value of the first information or the first authentication information included in each of the pieces of the first connected information, and using the one piece of the guarantee information added to the pieces of the first connected information.

11. The information processing device according to claim 1, wherein the one or more processors are configured to:
add a plurality of pieces of the guarantee information to a plurality of pieces of the first connected information, respectively, and
generate the second authentication information using the first information or the first authentication information included in each of the pieces of the first connected information, and the pieces of the guarantee information respectively corresponding to the pieces of the first connected information.

12. The information processing device according to claim 1, wherein the one or more processors are configured to:
add a plurality of pieces of the guarantee information to a plurality of pieces of the first connected information, respectively, and
generate the second authentication information using a compressed value of: the first information or the first authentication information included in each of the pieces of the first connected information; and the pieces of the guarantee information respectively corresponding to the pieces of the first connected information.

13. The information processing device according to claim 1, wherein the one or more processors are configured to:
derive a first verification result of the first authentication information, and
generate the second authentication information to authenticate the first information, the guarantee information, the first authentication information, and the first verification result, the second authentication information being generated using the first information or the first authentication information, the guarantee information, and the first verification result.

14. The information processing device according to claim 13, wherein the one or more processors are configured to:
add one piece of the guarantee information to a plurality of pieces of the first connected information, and
generate the second authentication information using the first information or the first authentication information included in each of the pieces of the first connected information, using the first verification result of the pieces of first authentication information, and using the one piece of the guarantee information added to the pieces of the first connected information.

15. The information processing device according to claim 13, wherein the one or more processors are configured to:
add one piece of the guarantee information to a plurality of pieces of the first connected information, and
generate the second authentication information using a compressed value of: the first information or the first authentication information included in each of the pieces of the first connected information; and the first verification results of the pieces of first authentication information, and using the one piece of the guarantee information added to the pieces of the first connected information.

16. The information processing device according to claim 13, wherein the one or more processors are configured to:
add a plurality of pieces of the guarantee information to a plurality of pieces of the first connected information, respectively, and
generate the second authentication information using the first information or the first authentication information included in each of the pieces of the first connected information, using the first verification result of the pieces of first authentication information, and using the pieces of the guarantee information respectively corresponding to the pieces of the first connected information.

17. The information processing device according to claim 13, wherein the one or more processors are configured to:
add a plurality of pieces of the guarantee information to a plurality of pieces of the first connected information, respectively, and
generate the second authentication information using a compressed value of: the first information or the first authentication information included in each of the pieces of the first connected information; the first verification result of the pieces of first authentication information; and the pieces of the guarantee information respectively corresponding to the pieces of the first connected information.

18. An information processing method implemented by a computer, the information processing method comprising:
receiving first connected information including first information and first authentication information to authenticate the first information;
adding, to the first connected information, guarantee information to guarantee an anteroposterior relation between reception of the first connected information and reception of another data;
generating second authentication information to authenticate the first information, the guarantee information, and the first authentication information, the second authentication information being generated using the first information or the first authentication information and using the guarantee information; and
outputting second connected information in which the first information, the first authentication information, the guarantee information, and the second authentication information are associated with each other.

* * * * *